(12) United States Patent
Samb

(10) Patent No.: US 12,726,364 B1
(45) Date of Patent: Sep. 1, 2026

(54) AUTONOMOUS MACHINE IDENTITY AND AUTHORITY PROTOCOL WITH CONSTRAINT-BOUND EXECUTION ENFORCEMENT AND VERIFIABLE EXECUTION RECEIPTS

(71) Applicant: Papa Gora Samb, Ellenwood, GA (US)

(72) Inventor: Papa Gora Samb, Ellenwood, GA (US)

(73) Assignee: Yandeh Holdings Inc., Wilmington, DE (US)

( * ) Notice: Subject to any disclaimer, the term of this patent is extended or adjusted under 35 U.S.C. 154(b) by 0 days.

(21) Appl. No.: 19/570,167

(22) Filed: Mar. 18, 2026

(51) Int. Cl.
*H04L 9/32* (2006.01)
*G06F 21/62* (2013.01)
(Continued)

(52) U.S. Cl.
CPC ........ *H04L 9/3247* (2013.01); *G06F 21/6254* (2013.01); *G06F 21/64* (2013.01); *H04L 9/3218* (2013.01); *H04L 9/50* (2022.05)

(58) Field of Classification Search
CPC ....... H04L 9/3247; H04L 9/50; H04L 9/3218; G06F 21/6254; G06F 21/64
See application file for complete search history.

(56) References Cited

U.S. PATENT DOCUMENTS 8,370,913 B2 2/2013 Hodgkinson et al.
8,990,900 B2 3/2015 Edwards et al.
(Continued)

FOREIGN PATENT DOCUMENTS

WO WO 2025/210622 A1 10/2025
WO WO 2025/215626 A1 10/2025

OTHER PUBLICATIONS

US 8,782,735 B1, 07/2014, Kumar (withdrawn)
(Continued)

*Primary Examiner* — Roderick Tolentino

(57) ABSTRACT

A deterministic execution control protocol for distributed autonomous systems improves the security of distributed computing systems by preventing unauthorized execution under compromised identity conditions through consistent, reproducible runtime enforcement and cryptographic verifiability. An authority artifact encodes an execution scope, a permission boundary, one or more execution constraints, and one or more integrity proof obligations. An enforcement point evaluates constraints against a runtime context obtained at execution time—not at session establishment—with consistent, reproducible outcomes, validates machine integrity evidence at execution time, applies execution controls, and generates a cryptographic proof structure binding the authorization decision to the artifact identifier and a runtime context digest. The cryptographic proof structure—also denominated a verifiable execution receipt or verification artifact—enables independent reproduced verification without enforcement point access. The protocol supports monotonic delegation, cross-domain federation, hardware-rooted attestation, AI agent commitment governance, latency-bounded constraint evaluation with race condition handling, portable constraint compilation, and degraded-mode enforcement.

25 Claims, 16 Drawing Sheets

(51) Int. Cl.
*G06F 21/64* (2013.01)
*H04L 9/00* (2022.01)

(56) References Cited

U.S. PATENT DOCUMENTS

| | | | | |
|---|---|---|---|---|
| 8,990,948 | B2 | 3/2015 | Kumar et al. | |
| 10,225,740 | B2 | 3/2019 | Bansal et al. | |
| 11,163,858 | B2 | 11/2021 | Taylor | |
| 11,398,906 | B2 | 7/2022 | Brickell | |
| 11,593,525 | B1 | 2/2023 | Sandall et al. | |
| 11,595,215 | B1 | 2/2023 | Madden | |
| 11,799,857 | B2 | 10/2023 | Michaud et al. | |
| 11,954,226 | B2 | 4/2024 | Kofman et al. | |
| 12,045,590 | B2 | 7/2024 | Bean et al. | |
| 12,058,265 | B2 | 8/2024 | Khoury et al. | |
| 12,126,654 | B2 | 10/2024 | Quintas et al. | |
| 12,174,954 | B1 | 12/2024 | Yeung et al. | |
| 12,192,244 | B2 | 1/2025 | DeJarnett | |
| 12,287,881 | B2 | 4/2025 | Schroder et al. | |
| 12,413,558 | B2 | 9/2025 | Andrews et al. | |
| 12,413,629 | B2 | 9/2025 | Robinson et al. | |
| 12,450,494 | B1 | 10/2025 | Mysore et al. | |
| 12,461,841 | B2 | 11/2025 | Williams et al. | |
| 12,463,833 | B2 | 11/2025 | Roman Cuesta et al. | |
| 12,468,798 | B2 | 11/2025 | Hassard et al. | |
| 12,475,115 | B2 | 11/2025 | Zhao et al. | |
| 12,483,411 | B1 | 11/2025 | Chen | |
| 12,489,633 | B1 * | 12/2025 | Arkoff | H04L 9/3213 |
| 12,547,677 | B1 | 2/2026 | Chawla et al. | |
| 12,562,968 | B1 | 2/2026 | Morgan et al. | |
| 2017/0180421 | A1 * | 6/2017 | Shieh | H04L 63/10 |
| 2017/0331791 | A1 | 11/2017 | Wardell et al. | |
| 2018/0109538 | A1 | 4/2018 | Kumar et al. | |
| 2021/0120044 | A1 * | 4/2021 | Balan | G06F 16/211 |
| 2022/0179945 | A1 | 6/2022 | Mondello et al. | |
| 2024/0168739 | A1 * | 5/2024 | Bean | G06F 8/4452 |
| 2024/0345993 | A1 * | 10/2024 | Madisetti | G06F 16/176 |
| 2026/0012432 | A1 * | 1/2026 | Bhat | G06F 9/5005 |
| 2026/0067314 | A1 * | 3/2026 | Pell Reddy | H04L 63/1425 |
| 2026/0073058 | A1 * | 3/2026 | Mogali | G06F 21/577 |
| 2026/0142933 | A1 * | 5/2026 | Bhat | H04L 47/822 |
| 2026/0155974 | A1 * | 6/2026 | Alhussain | H04L 9/321 |
| 2026/0161824 | A1 * | 6/2026 | Cardenes Cabre | G06F 21/6254 |

OTHER PUBLICATIONS

Li et al., "Inspecting Edge Data Integrity With Aggregate Signature in Distributed Edge Computing Environment," IEEE Transactions on Cloud Computing Year: 2022 | vol. 10, Issue: 4 | Journal Article | Publisher: IEEE.*

Wei et al., "Research on Integrity Measurement of Trusted Access for Cloud Manufacturing Equipment Terminals,"2025 9th International Conference on Cryptography, Security and Privacy (CSP) Year: 2025 | Conference Paper | Publisher: IEEE.*

U.S. Appl. No. 19/433,835, filed Dec. 2025, Attested Intelligence Holdings LLC (Attested Intelligence Holdings LLC), Systems and Methods for Generating and Enforcing Attested Governance Artifacts. (publicly disclosed by applicant; not yet published by USPTO as of filing of this IDS) https://attestedintelligence.com/patent.

OAuth 2.0 Authorization Framework, Hardt, D., Ed., RFC 6749, IETF, Oct. 2012. Available at: https://www.rfc-editor.org/info/rfc6749.

OAuth 2.0 Bearer Token Usage, Jones, M., and Hardt, D., RFC 6750, IETF, Oct. 2012. Available at: https://www.rfc-editor.org/info/rfc6750.

JSON Web Token (JWT), Jones, M., Bradley, J., and Sakimura, N., RFC 7519, IETF, May 2015. https://www.rfc-editor.org/info/rfc7519.

OAuth 2.0 Token Introspection, Richer, J., Ed., RFC 7662, IETF, Oct. 2015. Available at: https://www.rfc-editor.org/info/rfc7662.

JSON Web Token (JWT) Profile for OAuth 2.0 Access Tokens, Bertocci, V., RFC 9068, IETF, Oct. 2021. Available at: https://www.rfc-editor.org/info/rfc9068.

OAuth 2.0 Rich Authorization Requests, Lodderstedt, T., Richer, J., and Cambpell, B., RFC 9396, IETF, May 2023. Available at: https://www.rfc-editor.org/info/rfc9396.

OAuth 2.0 Demonstrating Proof of Possession (DPoP), Fett, D., Campbell, B., Bradley, J., Lodderstedt, T., Jones, M., and Waldman, D., RFC 9449, IETF, Sep. 2023. Available at: https://www.rfc-editor.org/info/rfc9449.

OAuth 2.0 Token Exchange, Jones, M., Nadalin, A., Campbell, B., Bradley, J., Mortimore, C., RFC 8693, IETF, Jan. 2020. Available at: https://www.rfc-editor.org/info/rfc8693.

Grant Negotitation and Authorization Protocol (GNAP), Richer, J., Ed., and Imbault, F., Ed., RFC 9635, IETF, Oct. 2024. Available at: https://www.rfc-editor.org/info/rfc9635.

The Kerberos Network Authentication Service (V5), Neuman, C., Yu, T., Hartman, S., and Raeburn, K., RFC 4120, IETF, JUl. 2005. Available at: https://www.rfc-editor.org/info/rfc4120.

eXtensible Access Control Markup Language (XACML) Version 3.0, OASIS Standard, Jan. 22, 2013. Available at: http://docs.oasis-open.org/xacml/3.0/xacml-3.0-core-spec-os-en.html.

Open Policy Agent (OPA), Cloud Native Computing Foundation, open-source general-purpose policy engine, graduated CNCF project, originated 2016, current version. Available at: https://www.openpolicyagent.org.

Cedar Policy Language, Amazon Web Services, open-source authorization policy language, initital public release May 2023. Available at: https://www.cedarpolicy.com.

Zanzibar: Google's Consistent, Global Authorization System, Pang, R., Caceres, R., Burrows, M., Chen, Z., Dave, P., Germer, N., Golynski, A., Graney, K., Kang, N., Kissner, L., Korn, J. L., Parmar, A., Richards, C D., and Wang, M., Proocedings of the USENIX Annual Technical Conference 2019, pp. 33-46, USENIX, Association, Jul. 2019. Available at: https://www.usenix.org/conference/atc19/presentation/pang.

Guide to Attribute Based Access Control (ABAC) Definition and Considerations, Hu, V. C., Ferraiolo, D. F., Kuhn, D. R., Schnitzer, A., Sandlin, K., Miller, R., and Scarfone, K., NIST Special Publication 800-162, National Institute of Standards and Technology, Jan. 2014. Available at: https://doi.org/10.6028/NIST.SP.800-162.

Information Technology—Role Based Access Control, ANSI INCITS 359-2012, American National Standards Institute / International Committee for Information Technology Standards, 2012.

Authentication in Distributed Systems: Theory and Practice, Lampson, B., Abadi, M., Burrows, M., and Wobber, E., ACM Transactions on Computer Systems, vol. 10, No. 4, pp. 265-310, Nov. 1992. DOI: 10.1145/138873.138874.

The Protection of Information in Computer Systems, Saltzer, J. H., and Schroeder, M. D., Proceedings of the IEEE, vol. 63, No. 9, pp. 1278-1308, Sep. 1975. DOI: 10.1109/PROC.1975.9939.

Keycloak, Red Hat, open-source identity and access management solution, originated 2014, current version. Available at: https://www.keycloak.org.

SPIFFE (Secure Production Identity Framework for Everyone), Cloud Native Computing Foundation, open-source workload identity framework, graduated CNCF project, originated 2018, current version. Available at: https://spiffe.io.

SPIRE (SPIFFE Runtime Environment), Cloud Native Computing Foundation, open-source reference implementation of SPIFFE specifications, originated 2018, current version. Available at: https://github.com/spiffe/spire.

Istio Service Mesh, open-source service mesh providing traffic management, security, and observability, originated 2017, current version. Available at: https://istio.io.

Macaroons: Cookies with Contextual Caveats for Decentralized Authorization in the Cloud, Birgisson, A., Politz, J. G., Erlingsson, U., Taly, A., Vrable, M., and Lentczner, M., Proceedings of the 21st Annual Network and Distributed System Security Symposium (NDSS 2014), Internet Society, Feb. 2014.

(56) References Cited

OTHER PUBLICATIONS

Biscuit—Bearer Tokens with Offline Attenuation and a Logic Language, Biscuit Auth Project, open-source specification and reference implementations, originated 2019, current version. Available at: https://www.biscuitsec.org.
User Controlled Authorization Network (UCAN) Specification, Fission Codes, open-source decentralized capability token specification, originated 2021, current version. Available at: https://github.com/ucan-wg/spec and https://ucan.xyz/.
Tenuo—High-performance Capability Engine for AI Agents, Tenuo AI, open-source cryptographic authorization infrastructure, GitHub repository tenuo-ai/tenuo, originated 2025-2026. Available at: https://github.com/tenuo-ai/tenuo.
Defeating Prompt Injections by Design (CaMeL—Capabilities for Machine Learning), Debenedetti, E., Shumailov, I., Fan, T., Hayes, J., Carlini, N., Fabian, D., Kern, C., Shi, C., Terzis, A., and Tramer, F., arXiv preprint arXiv:2503.18813, version 1 posted Mar. 24, 2025, version 2 posted Jun. 24, 2025. Available at: https://arxiv.org/abs/2503.18813.
PAuth—Precise Task-Scoped Authorization For Agents, Sharma, R. K., Jiang, L., Lin, Z., and Chen, S., arXiv preprint arXiv:2603.17170, posted Mar. 17, 2026. Available at: https://arxiv.org/abs/2603.17170.
Attenuating Authorization Tokens for Agentic Delegation Chains, Niyikiza, N. A., Internet-Draft draft-niyikiza-oauth-attenuating-agent-tokens-00, IETF OAuth Working Group, Tenuo, Mar. 16, 2026, expires Sep. 17, 2026. Available at: https://datatracker.ietf.org/doc/draft-niyikiza-oauth-attenuating-agent-tokens/.
Autonomous Agents Need Authority, Joubert, P., Rippletide Technical Blog, published Feb. 17, 2026, accessed Apr. 21, 2026. Available at: https://www.rippletide.com/resources/blog/autonomous-agents-need-execution- authority.
AgentDojo: A Dynamic Environment to Evaluate Prompt Injection Attacks and Defenses for LLM Agents, Debenedetti, E., Zhang, J., Balunovic, M., Beurer-Kellner, L., Fischer, M., and Tramer, F., Advances in Neural Information Processing Systems 37 (NeurIPS 2024), 2024. Preprint available at: https://arxiv.org/abs/2406.13352.
Agent Security Bench (ASB): Formalizing and Benchmarking Attacks and Defenses in LLM-based Agents, Zhang, H., et al., Proceedings of the International Conference on Learning Representations (ICLR 2025), 2025. Preprint available at arXiv:2410.02644.
Authenticated Delegation and Authorized AI Agents, South, T., Marro, S., Hardjono, T., Mahari, R., Whitney, C. D., Greenwood, D., Chan, A., and Pentland, A., arXiv preprint arXiv:2501.09674, posted Jan. 16, 2025. Available at: https://arxiv.org/abs/2501.09674.
TPM 2.0 Library Specification, Trusted Computing Group, Family "2.0," Level 00, Revision 01.59, Nov. 2019 (or later revision). Available at: https://trustedcomputinggroup.org/resource/tpm-library-specification/.
TEE System Architecture v1.2 (GPD_SPE_009), GlobalPlatform Technical Specification, Nov. 2018 (or later revision). Available at: https://globalplatform.org/specs-library/tee-system-architecture/.
Remote ATtestation procedureS (RATS) Architecture, Birkholz, H., Thaler, D., Richardson, M., Smith, N., and Pan, W., RFC 9334, IETF, Jan. 2023. Available at: https://www.rfc-editor.org/info/rfc9334.
The Entity Attestation Token (EAT), Lundblade, L., Mandyam, G., O'donoghue, J., and Wallace, C., RFC 9711, IETF, Jan. 2025. Available at: https://www.rfc-editor.org/info/rfc9711.
The Part-Time Parliament (Paxos consensus algorithm), Lamport, L., ACM Transactions on Computer Systems, vol. 16, No. 2, pp. 133-169, May 1998. DOI: 10.1145/279227.279229.
Practical Byzantine Fault Tolerance, Castro, M., and Liskov, B., Proceedings of the Third Symposium on Operating Systems Design and Implementation (OSDI '99), pp. 173-186, USENIX Association, Feb. 1999.
Bitcoin: A Peer-to-Peer Electronic Cash System, Nakamoto, S., whitepaper, Oct. 31, 2008. Available at: https://bitcoin.org/bitcoin.pdf.
Opentelemetry, Cloud Native Computing Foundation, open-source observability framework, graduated CNCF project, originated 2019, current version. Available at: https://opentelemetry.io.
Certificate Transparency, Laurie, B., Langley, A., and Kasper, E., RFC 6962, IETF, Jun. 2013. Available at: https://www.rfc-editor.org/info/rfc6962.
Sigstore: Software Signing for Everybody, Newman, Z., Meyers, J., and Torres-Arias, S., open-source signing and transparency infrastructure for software artifacts, Open Source Security Foundation, originated 2021. Available at: https://www.sigstore.dev.
In-toto: Providing farm-to-table guarantees for bits and bytes, Torres-Arias, S., Afzali, H., Kuppusamy, T. K., Curtmola, R., and Cappos, J., Proceedings of the 28th USENIX Security Symposium, pp. 1393-1410, USENIX Association, Aug. 2019. Available at: https://www.usenix.org/conference/usenixsecurity19/presentation/torres-arias.
Supply-chain Levels for Software Artifacts (SLSA), Open Source Security Foundation, framework for software supply chain integrity, current version. Available at: https://slsa.dev.
A Digital Signature Based on a Conventional Encryption Function, Merkle, R. C., Advances in Cryptology—CRYPTO '87, Lecture Notes in Computer Science, vol. 293, pp. 369-378, Springer-Verlag, 1988 (conference Aug. 1987).
JSON Canonicalization Scheme (JCS), Rundgren, A., Jordan, B., and Erdtman, S., RFC 8785, Independent Submission (Informational), Jun. 2020. Available at: https://www.rfc-editor.org/info/rfc8785.
Concise Binary Object Representation (CBOR), Bormann, C., and Hoffman, P., RFC 8949 / STD 94, IETF, Dec. 2020. Available at: https://www.rfc-editor.org/info/rfc8949.
Canonical XML Version 1.1, World Wide Web Consortium (W3C), W3C Recommendation, May 2, 2008. Available at: https://www.w3.org/TR/XML-c14n11/.
Module-Lattice-Based Digital Signature Standard (ML-DSA), NIST FIPS 204, National Institute of Standards and Technology, Aug. 13, 2024. Available at: https://csrc.nist.gov/pubs/fips/204/final.
Zero Trust Architecture, Rose, S., Borchert, O., Mitchell, S., and Connelly, S., Nist Special Publication 800-207, National Institute of Standards and Technology, Aug. 2020. Available at: https://doi.org/10.6028/NIST.SP.800-207.
Security and Privacy Controls for Information Systems and Organizations, NIST Special Publication 800-53, Revision 5, National Institute of Standards and Technology, Sep. 2020 (with updates). Available at: https://csrc.nist.gov/pubs/sp/800/53/r5/upd1/final.
Artificial Intelligence Risk Management Framework (AI RMF 1.0), NIST AI 100-1, National Institute of Standards and Technology, Jan. 2023. Available at: https://doi.org/10.6028/NIST.AI.100-1.
Commercial National Security Algorithm Suite 2.0 (CNSA 2.0), National Security Agency, Sep. 2022 (updated 2024). Available at: https://media.defense.gov/2025/May30/2003728741/-1/-1/0/CSA_CNSA_2.0_ALGORITHMS.PDF.
Announcing the AI Agent Standards Initiative for Interoperable and Secure Innovation, Center for AI Standards and Innovation (CAISI), National Institute of Standards and Technology, Feb. 17, 2026. Available at: https://www.nist.gov/news-events/news/2026/02/announcing-ai-agent-standards-initiative-interoperable-and-secure.
Accelerating the Adoption of Software and AI Agent Identity and Authorization (Draft Concept Paper), National Cybersecurity Center of Excellence (NCCoE) at the National Institute of Standards and Technology, Feb. 2026 (public comment closed Apr. 2, 2026). https://www.nccoe.nist.gov/sites/default/files/2026-02/accelerating-the-adoption-of-software-and-ai-agent-identity-and-authorization-concept-paper.pdf.
Attribute-based Access Control for Microservices-based Applications using a Service Mesh, Chandramouli, R., Zack Butcher, Aradhna Chetal NIST Special Publication 800-204B, National Institute of Standards and Technology, Aug. 2022. Available at: https://doi.org/10.6028/NIST.SP.800-204B.
Security Strategies for Microservices-based Application Systems, Chandramouli, R., NIST Special Publication 800-204, National Institute of Standards and Technology, Aug. 2019. Available at: https://doi.org/10.6028/NIST.SP.800-204.

(56) References Cited

OTHER PUBLICATIONS

Request for Information Regarding Security Considerations for Artificial Intelligence Agents, Center for AI Standards and Innovation (CAISI), National Institute of Standards and Technology, Federal Register Docket No. NIST-2025-0035, published Jan. 8, 2026, comment period closed Mar. 9, 2026. Available at: https://www.federalregister.gov/documents/2026/01/08/2026-00206/.

Guide to Computer Security Log Management, Kent, K., and Souppaya, M., NIST Special Publication 800-92, National Institute of Standards and Technology, Sep. 2006. Available at: https://doi.org/10.6028/NIST.SP.800-92.

Module-Lattice-Based Key-Encapsulation Mechanism Standard (ML-KEM), NIST FIPS 203, National Institute of Standards and Technology, Aug. 13, 2024. Available at: https://csrc.nist.gov/pubs/fips/203/final.

OWASP Top 10 for Large Language Model Applications (Agentic AI extensions), Open Worldwide Application Security Project Foundation, published Dec. 2025. Available at: https://owasp.org/www-project-top-10-for-large-language-model-applications/.

A Decentralized Model for Information Flow Control, Myers, A. C., and Liskov, B., Proceedings of the 16th ACM Symposium on Operating Systems Principles (SOSP '97), Operating Systems Review, vol. 31, No. 5, pp. 129-142, ACM, Oct. 1997.

Language-Based Information-Flow Security, Sabelfeld, A., and Myers, A. C., IEEE Journal on Selected Areas in Communications, vol. 21, No. 1, pp. 5-19, Jan. 2003.

Proof-Carrying Code, Necula, G. C., Proceedings of the 24th ACM SIGPLAN-SIGACT Symposium on Principles of Programming Languages (POPL '97), pp. 106-119, ACM, Jan. 1997.

Jaeger—End-to-End Distributed Tracing System, Cloud Native Computing Foundation, open-source distributed tracing platform, graduated CNCF project, originated 2017, current version. Available at: https://www.jaegertracing.io.

Prometheus—Systems Monitoring and Alerting Toolkit, Cloud Native Computing Foundation, open-source time-series monitoring system, graduated CNCF project, originated 2012, current version. Available at: https://prometheus.io.

Dapper, a Large-Scale Distributed Systems Tracing Infrastructure, Sigelman, B. H., Barroso, L. A., Burrows, M., Stephenson, P., Plakal, M., Beaver, D., Jaspan, S., and Shanbhag, C., Google Technical Report dapper-2010-1, Apr. 2010. Available at: https://research.google/pubs/dapper-a-large-scale-distributed-systems-tracing-infrastructure/.

Hyperledger Fabric, Linux Foundation, open-source permissioned distributed ledger platform, graduated Hyperledger project, originated 2016, current version. Available at: https://www.hyperledger.org/use/fabric.

Model Context Protocol (MCP) Specification, Anthropic PBC, open-source protocol for AI agent tool integration, initial public release Nov. 25, 2024; current specification version (and revisions through Nov. 25, 2025). Available at: https://spec.modelcontextprotocol.io and https://github.com/modelcontextprotocol/specification.

Agent-to-Agent (A2A) Protocol Specification, Google LLC, open-source agent collaboration protocol, originated 2025. Available at: https://github.com/google/agent-to-agent.

Capability Myths Demolished, Miller, M. S., Yee, K.-P., and Shapiro, J., Combex Inc. and Johns Hopkins University, Technical Report SRL2003-02, Mar. 2003. Available at: http://srl.es.jhu.edu/pubs/SRL.2003-02.pdf.

The Transport Layer Security (TLS) Protocol Version 1.3, Rescorla, E., RFC 8446, IETF, Aug. 2018. Available at: https://www.rfc-editor.org/info/rfc8446.

BeyondCorp: A New Approach to Enterprise Security, Ward, R., and Beyer, B., ;login: The Usenix Magazine, vol. 39, No. 6, pp. 6-11, USENIX Association, Dec. 2014.

BeyondCorp: Design to Deployment at Google, Osborn, B., Mcwilliams, J., Beyer, B., and Saltonstall, M., ;login: The Usenix Magazine, vol. 41, No. 1, pp. 28-34, USENIX Association, Spring 2016.

Runtime Governance for AI Agents: Policies on Paths, Kaptein, M., Khan, V.-J., and Podstavnychy, A., arXiv preprint arXiv:2603.16586, posted Mar. 17, 2026. Available at: https://arxiv.org/abs/2603.16586.

Execution-Time Authority Enforcement: A Novel Architecture for Protocol-Level Authorization at Irreversible System Boundaries, Das, S., Zendo preprint, version 1 posted Jan. 30, 2026; version 2 posted Feb. 11, 2026. DOI: 10.5281/zenodo.18431898. Available at: https://doi.org/10.5281/zenodo.18431898.

From Trust to Truth (companion ETAE paper), Das, S., Zenodo preprint, posted Feb. 19, 2026. DOI: 10.5281/zenodo.18708186. Available at: https://doi.org/10.5281/zenodo.18708186.

A Protocol for Privacy-Preserving AML Compliance in CBDCs Using Virtual Identities and Jurisdiction Tokens, Das, S., SSRN Working Paper No. 5742782, posted Nov. 13, 2025. DOI: 10.2139/ssrn.5742782. Available at: https://ssrn.com/abstract=5742782.

Workload Identitiy in a Multi System Environment (WIMSE) Architecture, Salowey, J., Rosomakho, Y., and Tschofeng, H., Internet-Draft draft-ietf-wimse-arch-06 IETF, Sep. 30, 2025, Available at: https://datatracker.ietf.org/doc/draft-ietf-wimse-arch/06 and https://www.ietf.org/archive/id/draft-ietf-wimse-arch-06.html.

Wimse Workload Credentials, Campbell, B., Salowey, J., Schwenkschuster, A., Sheffer, Y., and Rosomakho, Y., Internet-Draft draft-ietf-wimse-workload-creds-00, IETF, Nov. 6, 2025. Available at: https://datatracker.ietf.org/doc/draft-ietf-wimse-worload-creds/00/.

Wimse Workload to Workload Authentication, Campbell, B., Salowey, J., Schwenkschuster, A., and Sheffer, Y., Internet-Draft draft-ietf-wimse-s2s-protocol-05, IETF, Jun. 19, 2025. Available at: https://datatracker.ietf.org/doc/draft-ietf-wimse-s2s-protocol/05/.

An Architecture for Trustworthy and Transparent Digital Supply Chains, Birkholz, H., Delignat-Lavaud, A., Fournet, C., Deshpande, Y., and Lasker, S., Internet-Draft draft-ietf-scitt-architecture-22, IETF SCITT Working Group, Mar 26, 2025. Available at: https://datatracker.ietf.org/doc/draft-ietf-scitt-architecture/22/.

Secure Intent Protocol: JWT Compatible Agentic Identity and Workflow Mangement, GOSWAMI, A., Internet-Draft draft-goswami-agentic-jwt-00, IETF, Jan. 1, 2026. Available at: https://datatracker.ietf.org/doc/draft-goswani-agentic-jwt/00/.

GuardNet Authoriazation Network (GNA) for Pre-Execution Authorization of High-Risk Actions, Madaras, A., and Estis, J., Internet-Draft draft-madaras-guardsuite-gna-00, IETF, Dec. 2, 2025. Available at: https://datatracker.ietf.org/doc/draft-madaras-guardsuite-gna/00/.

OAuth 2.0 Attestation-Based Client Authentication, Tobias Looker, Paul Bastian, Christian Borman, Internet-Draft draft-ietf-oauth-attestation-based-client-auth-03, IETF OAuth Working Group, May 2024 (and subsequent versions through 2025). Available at: https://datatracker.ietf.org/doc/draft-ietf-oauth-attestation-based-client-auth.

Policy Cards: Machine-Readable Runtime Governance for Autonomous AI Agents, Mavračić, J. (Symbolic Dynamics Ltd.), arXiv preprint arXiv:2510.24383v1, posted Oct. 28, 2025 (paper dated Oct. 28, 2025). Canonical archived record and DOI: 10.5281/zenodo.17391796. Available at: https://arxiv.org/abs/2510.24383 and https://doi.org/10.5281/zenodo.17391796.

VERA: Verifiable Enforcement for Runtime Agents, Yamijala, G., (Berlin AI Labs), Zenodo preprint, version 1, published Feb. 12, 2026. DOI: 10.5281/zenodo.18625876. Available at: https://zenodo.org/records/18625876.

ILION: Deterministic Pre-Execution Safety Gates for Agentic AI Systems, Chitan, F. A., arXiv preprint arXiv:2603.13247v1, posted Feb. 22, 2026. Available at: https://arxiv.org/abs/2603.13247.

Governing Dynamic Capabilities: Crytographic Binding and Reproducibility Verification for AI Agent Tool Use, Zhou, Z. (Genupixel Technology Pte. Ltd.), arXiv preprint arXiv:2603.14332v1, posted Mar. 15, 2026. Available at: https://arxiv.org/abs/2603.14332v1.

Crittora Introduces Agent Permission Protocol (APP), an Execution-Time Authorization Layer for AI Agents, Crittora, Inc. (Rowan, E., Ornelas, G. I.), press release, Jan. 20, 2026. Available at: https://www.prnewswire.com/news-releases/crittora-introduces-agent-permission-protocol-app-an-execution-time-authorization-layer-for-ai-agents-302665368.html.

(56) References Cited

OTHER PUBLICATIONS

Crittora Makes OpenClaw Enterprise-Ready by Eliminating Ambient Authority in Autonomous Agents, Crittora, Inc., press release, Feb. 24, 2026. Available at: https://www.prnewswire.com/news-releases/crittora-makes-openclaw-enterprise-ready-by-eliminating-ambient-authority-in-autonomous-agents-302695894.html.
Information technology—Artificial intelligence—Management system, ISO/IEC 42001:2023, International Organization for Standardization and International Electrotechnical Commission, Geneva, Dec. 2023. Available at: https://www.iso.org/standard/42001.
Regulation (EU) 2024/1689 of the European Parliament and of the Council of Jun. 13, 2024 laying down harmonised rules on artificial intelligence and amending certain Union legislative acts (Artificial Intelligence Act), European Parliament and Council of the European Union, Official Journal of the European Union, L Series, Jul. 12, 2024. Available at: https://eur-lex.europa.eu/eli/reg/2024/1689/oj.
prEN 18286: Artificial Intelligence—Quality Management System for EU AI Act Regulatory Purposes, Draft European Standard, CEN-CENELEC Joint Technical Committee 21 (JTC 21), public enquiry opened Nov. 10, 2025. Available at: https://standards.cencenelec.eu/ and at https://standards.iteh.ai/catalog/standards/cen/34ea911c-a980-4433-85ac-1344f93da01b/fpren-18286.
General-Purpose AI Code of Practice (GP AI Code of Practice), European Commission, published Jul. 2025. Available at: https://digital-strategy.ec.europa.eu/en/policies/contents-code-gpai.
Control Overlays for Securing AI Systems (COSAiS)—Annotated Outline for Predictive AI Use Case, National Institute of Standards and Technology, Jan. 8, 2026 (public comment closed Feb. 13, 2026). NIST Special Publicationn 800-53 control overlay extension to AI Systems. Available at: https://csrc.nist.gov/csrc/media/Projects.cosais/documents/COSAiS-Predictive-AI-annotated-outline-Jan2026.pdf.
Intelligent AI Delegation, Nenad Tomašev, Matija Franklin and Simon Osindero, arXiv preprint arXiv:2602:11865, Google DeepMind, Feb. 12, 2026. Available at: https://arxiv.org/abs/2602.11865.
HDP: A Lightweight Cryptographic Protocol for Human Delegation Provenance in Agentic AI Systems, Dalugoda, A. (Helixar Limited), arXiv preprint arXiv:2604.04522, posted Apr. 6, 2026. Available at: https://arxiv.org/abs/2604.04522.
Human Delegation Provenance Protocol (HDP) for Agentic AI Systems, Dalugoda, A. (Helixar Limited), IETF Internet-Draft draft-helixar-hdp-agentic-delegation-00, Apr. 2026. Available at: https://datatracker.ietf.org/doc/draft-helixar-hdp-agentic-delegation/.
Before the Tool Call: Deterministic Pre-Action Authorization for Autonomous AI Agent, Uchibeke, U. (APort Technologies Inc.), arXiv preprint arXiv:2603.20953v1, posted Mar. 21, 2026. Available at: https://arxiv.org/abs/2603.20953.
Right-to-Act: A Pre-Execution Non-Compensatory Decision Protocol for AI Systems , Lavi, G., arXiv preprint arXiv:2604.24153v1, posted Apr. 27, 2026. Available at: https://arciv.org/abs/2604.24153.
Harnessing Embodied Agents: Runtime Governance for Policy-Constrained Execution, Qin, X., Luan, S., See, J., Yang, C., and Li, Z., ArXiv preprint arXiv:2604.07833v2, posted Apr. 10, 2026. Available at: https://arxiv.org/abs/2604.07833.
Governed Capability Evolution Agents: Safe Upgrade, Compatibility Checking, and Runtime Rollback for Embodied Capability Modules, Qin, X., Luan, S., See, J., Yang, C., and Li, Z., arXiv preprint arXiv:2604.08059, posted Apr. 11, 2026. Available at https://arxiv.org/abs/2604.08059.
ECM Contracts: Contract-Aware, Versioned, and Governable Capability Interfaces for Embodied Agents, Qin, X., Luan, S., See, J., Yang, C., and Li, Z., arXiv preprint arXiv:2604.13097, posted Apr. 17, 2026. Available at: https://arvix.org/abs/2604.13097.
Tool Receipts, Not Zero-Knowledge Proofs: Practical Hallucination Detection for AI Agents, Abhinaba Basu, arXiv preprint arXiv:2603.10060, posted Mar. 2026. Available at: https://arxiv.org.abs/2603.10060.
Proof-of-Guardrail in AI Agents and What Not to Trust from It, Xisen Jin, Michael Duan, Qin Lin, Aaron Chan, Zhenglun Chen, Junyi Du, Xiang Ren arXiv preprint arXiv:2603.05786, posted Mar. 2026. Available at: https://arxiv.org/abs/2603.05786.
Bounding the Black Box: A Statistical Certification Framework for AI Risk Regulation, Levy, N., and Perl, G., arXiv preprint arXiv:2604.21854, posted Apr. 2026. Available at: https://arxiv.org/abs/2604.21854.
AI Agent Authentication and Authorization, Pieter Kasselman, Jeff Lombardo, Yaroslav Rosomakho , Brian Campbell , Nick Steele IETF Internet-Draft draft-klrc-aiagent-auth-01, Mar. 2026. Available at: https://datatracker.ietf.org/doc/draft-klrc-aiagent-auth/.
Agent Identity Protocol (AIP): Verifiable Delegation for AI Agent Systems, Prakash, P., IETF Internet-Draft draft-prakash-aip-00, Mar. 27, 2026. Available at: https://datatracker.ietf.org/doc/draft-prakash-aip/.
Agent Identity Protocol (AIP): Decentralized Identity and Delegation for AI Agents, Singla P., IETF Internet-Draft draft-singla-agent-identity-protocol-00, Apr. 17, 2026 (expires Oct. 19, 2026). Available at: https://datatracker.ietf.org/doc/draft-singla-agent-identity-protocol/.
Transaction Tokens For Agents, Raut, A., IETF Internet-Draft draft-araut-oauth-transaction-tokens-for-agents-01, May 2026 (earlier revision draft-oauth-transaction-tokens-for-agents-04 also considered). Available at: https://datatracker.ietf.org/doc/draft-araut-oauth-transaction-tokens-for-agents/.
Structured and Constraint Extensions for OAuth Scopes, J. Chen, M. Chen, L. Su, IETF Internet-Draft draft-chen-oauth-scope-agent-extensions-00, Mar. 2026. Available at: https://www.ietf.org/archive/id/draft-chen-oauth-scope-agent-extensions-00.html.
Execution Outcome Verification (EOV) Receipts for AI-Issued Verifiable Credentials, Morrow (autonomous research agent / morrow.run) and Sogomonian, IETF Internet-Draft draft-morrow-sogomonian-exec-outcome-attest-00, Apr. 2026; companion record at Zenodo DOI 10.5281/zenodo.19430572. Available at: https://datatracker.ietf.org/doc/draft-morrow-scitt-execution-receipt/ and https://zenodo.org.records/19430572.
Careful Adoption of Agentic AI Services, Cybersecurity and Infrastructure Security Agency (CISA), National Security Agency (NSA), Australian Signals Directorate's Australian Cyber Security Centre (ASD's ACSC), Canadian Centre for Cyber Security (CCCS), United Kingdom National Cyber Security Centre (NCSC-UK), and New Zealand National Cyber Security Centre (NCSC-NZ), joint guidance, published May 1, 2026 (initial release Apr. 30, 2026). Available at: https://www.cisa.gov/resources-tools/resources/careful-adoption-agentic-ai-services.
FIDO Alliance Agentic Authentication Technical Working Group and Payments Technical Working Group; contributions including Google Agent Payments Protocol (AP2) and Mastercard Verifiable Intent framework, FIDO Alliance announcement, Apr. 28, 2026. Available at: https://fidoalliance.org/fido-alliance-to-develop-standards-for-trusted-ai-agent-interactions/.
Agent Governance Toolkit (open-source, MIT license), Microsoft Corporation, initial release Apr. 2, 2026; positioned as first toolkit addressing all ten risks in the OWASP Top 10 for Agentic Applications with deterministic sub-millisecond policy enforcement. Available at: https://opensource.microsoft.com/blog/2026/04/02/introducing-the-agent-governance-toolkit-open-source-runtime-security-for-ai-agents/.
Verifiable Runtime for Autonomous AI Agents, EQTY Lab, announced at NVIDIA GTC 2026, Mar. 18, 2026; hardware-rooted runtime leveraging NVIDIA Confidential Computing and BlueField Data Processing Unit. Available at: https://www.eqtylab.io/blog/introducing-verifiable-runtime.
Introducing Gemini Enterprise Agent Platform—Agent Identity, Agent Registry, and Agent Gateway, Google LLC / Google Cloud, product announcement, Apr. 22, 2026; assigns each agent a unique cryptographic ID with auditable trail mapped to authorization policies. Available at: https://cloud.google.com/blog/products/ai-machine-learning/introducing-gemini-enterprise-agent-platform.
Okta for AI Agents and the Blueprint for the Secure Agentic Enterprise, Okta, Inc., product announcement Mar. 16, 2026; general availability Apr. 30, 2026. Available at: https://www.businesswire.com/news/home/20260316388961/en/.

(56) References Cited

OTHER PUBLICATIONS

Open Agent Passport (OAP) Specification, APort Technologies Inc., open-source specification repository, accessed through May 2026. Available at: https://github.com/aporthq/aport-spec.
State of AI Agent Security 2026, Mishra, S., Grantex Research, published Mar. 15, 2026; audit of authorization practices across 30 popular open-source AI agent projects representing over 500,000 combined stars. Available at: https://grantex.dev/report/state-of-agent-security-2026.
CVE-2026-26118: Server-Side Request Forgery vulnerability in Microsoft Azure Model Context Protocol Server, Common Vulnerabilities and Exposures Program, MITRE Corporation, 2026 (CVSS 8.8); cited in arXiv:2603.20953v1 (Uchibeke 2026) as evidence of the pre-action authorization gap addressed by the present application. Available at: https://cve.mitre.org/.
Control the Chain, Secure the System: Fixing AI Agent Delegation for Secure Chains, Kolhe, K., Cloud Security Alliance / Okta technical blog, Mar. 25, 2026. Available at:https://cloudsecurityalliance.org.blog/2026/03/25/control-the-chain-secure-the-system-fixing-ai-agent-delegation.

* cited by examiner

Figure 2:
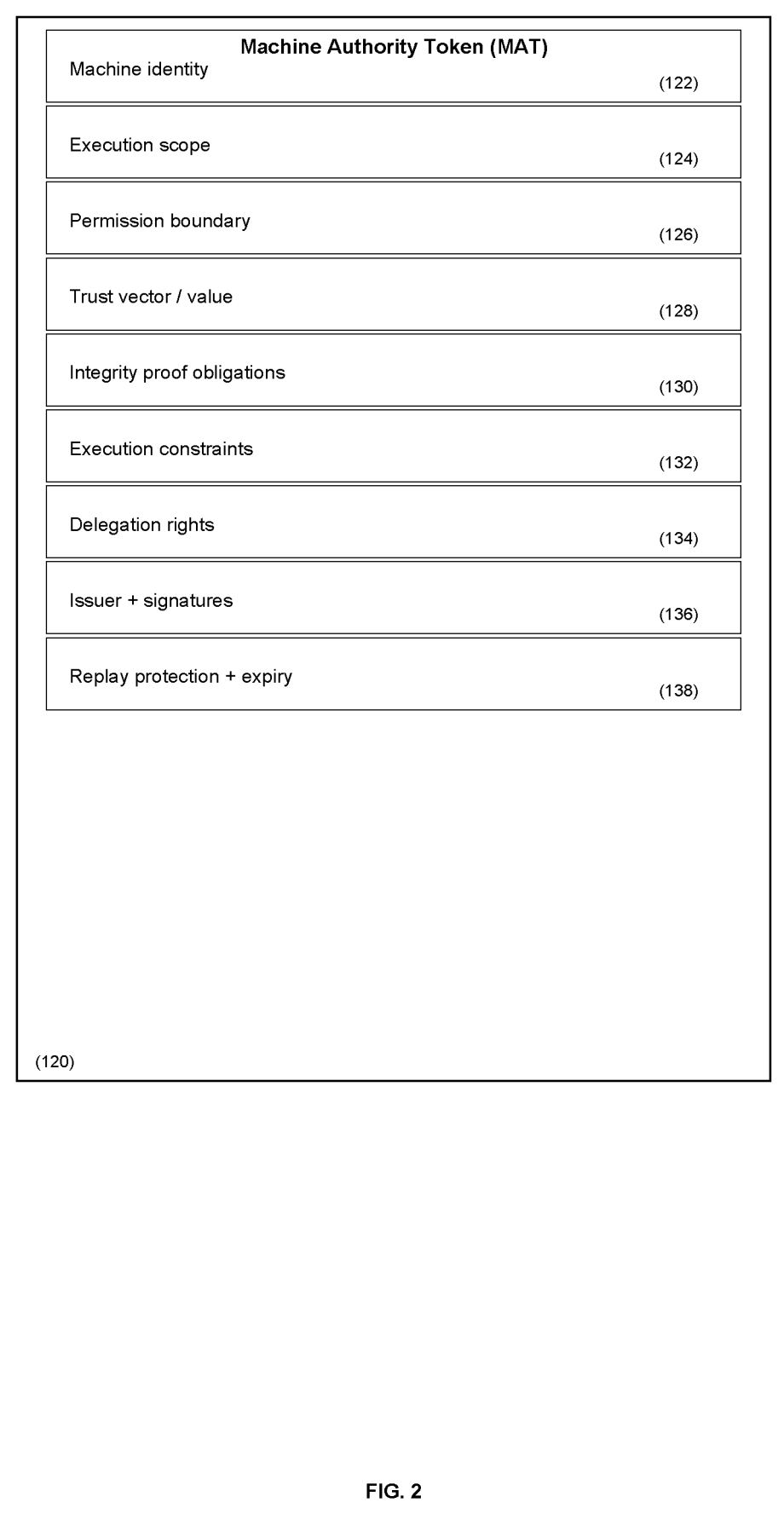

Machine Authority Token (MAT)

Machine identity (122)

Execution scope (124)

Permission boundary (126)

Trust vector / value (128)

Integrity proof obligations (130)

Execution constraints (132)

Delegation rights (134)

Issuer + signatures (136)

Replay protection + expiry (138)

AUTONOMOUS MACHINE IDENTITY AND AUTHORITY PROTOCOL WITH CONSTRAINT-BOUND EXECUTION ENFORCEMENT AND VERIFIABLE EXECUTION RECEIPTS

TECHNICAL FIELD

The present disclosure relates to distributed computing systems, machine-to-machine security protocols, cryptographic execution governance, autonomous agent control architectures, real-time constraint enforcement under bounded latency requirements, and tamper-evident audit systems. More specifically, the present disclosure provides a deterministic execution control protocol for distributed autonomous systems that enforces execution authority at the machine level through cryptographic artifact validation, reproducible constraint evaluation, integrity attestation, and generation of cryptographic proof structures constituting verifiable execution receipts or verification artifacts-achieving concrete technical improvements to the security, integrity, real-time performance, and auditability of distributed computing systems that cannot be obtained through conventional identity, authorization, or policy management mechanisms alone.

BACKGROUND

Distributed computing systems increasingly deploy autonomous agents, artificial intelligence (AI)-driven processes, and large-scale automation frameworks that execute privileged actions across cloud control planes, identity systems, continuous integration and continuous deployment (CI/CD) pipelines, network infrastructure, endpoints, and cyber-physical device controllers. These environments demand execution security guarantees that existing technical architectures structurally cannot provide.

Conventional identity and authorization systems govern whether an entity may access a resource. They do not govern, at the machine level, whether a specific execution operation may proceed at a specific instant in time, under verified integrity conditions, within defined operational bounds, and within latency requirements compatible with real-time distributed system operation. The distinction is technically material: an access control decision is made at authentication or session establishment time using static or coarsely scoped role assignments, without evaluating runtime machine state, current integrity posture, or real-time operational context. A compromised machine entity that holds valid credentials may execute privileged actions outside its legitimate operational envelope once initial access is granted, and no existing authorization system prevents this in real time.

In addition to correctness failures, conventional systems exhibit latency and synchronization deficiencies in distributed enforcement contexts. When multiple enforcement points must cooperate to govern a single execution operation—as in layered gateway-plus-host enforcement architectures—no existing protocol provides a specified mechanism for synchronizing constraint evaluation state, handling race conditions arising from concurrent execution requests against a shared resource state precondition, or bounding the latency of constraint evaluation in a manner verifiable from the resulting audit record. These are concrete system engineering problems distinct from policy logic or governance abstraction.

Integrity evidence is routinely decoupled from authorization evaluation and is not validated at the moment of execution. Audit records are not cryptographically bound to specific authorization decisions, are not anchored to execution context, and are susceptible to post-hoc alteration. The absence of a deterministic runtime execution control mechanism at the protocol layer-one that evaluates constraints with reproducible, consistent outcomes, validates integrity evidence, bounds evaluation latency, and produces cryptographic proof structures enabling independent reproduced verification at time-of-use—is the specific technical problem addressed by the present disclosure.

SUMMARY OF THE INVENTION

The present disclosure provides a deterministic execution control protocol for distributed autonomous systems that achieves concrete technical improvements to the security and operational integrity of such systems. The present disclosure: (i) prevents unauthorized execution under compromised identity conditions by binding execution permission to runtime integrity evidence evaluated at time-of-use; (ii) generates cryptographic proof structures—also referred to herein as verifiable execution receipts or verification artifacts—that cryptographically bind authorization decisions to specific runtime context digests and enable reproduced independent verification; (iii) enforces constraint evaluation with consistent, reproducible outcomes under bounded latency requirements and handles race conditions arising from concurrent execution requests against shared resource state preconditions; (iv) compiles portable constraint specifications into deterministic enforcement-point-specific rule formats; and (v) provides degraded-mode enforcement that tightens controls in proportion to evidence unavailability rather than failing open or halting.

The technical improvements described herein are not achieved by any existing identity management, access control, policy engine, security orchestration, or audit logging system. No prior art system performs per-execution constraint evaluation against runtime context under bounded latency with cryptographically bound verification artifact generation at the enforcement point. The present disclosure operates on specific machine-readable data structures—authority artifacts and cryptographic proof structures—through specific cryptographic and reproducible computational operations that produce concrete improvements in security, auditability, and operational integrity as specific technical effects, not merely abstract governance outcomes.

STATEMENT OF SPECIFIC TECHNICAL IMPROVEMENTS

The subject matter of the present disclosure is directed to specific improvements to the technical functioning of distributed computing systems and is not directed to an abstract idea. The following technical improvements are provided by the claimed invention and are not achieved by prior art systems:

First Technical Improvement—Reproducible Per-Execution Constraint Enforcement. The present disclosure introduces runtime enforcement of execution constraints at the enforcement point, evaluated against a runtime context obtained at the moment of execution—not at session or request establishment time—wherein the evaluation is consistent and reproducible such that the same constraint set and runtime context produce the same evaluation outcome, enabling independent third-party verification. The specific technical effect is prevention of execution of operations within a machine entity's broad access scope that fall outside its current operational boundary due to changed runtime conditions including network zone, time window, resource state, risk score, or attestation freshness. This operates on specific data structures through specific computational operations to produce a ternary execution control decision with verifiable rationale codes that prior art does not produce. A system employing probabilistic or heuristic constraint evaluation—wherein the same inputs may produce different evaluation outcomes across invocations—cannot achieve this technical effect and cannot generate a cryptographic proof structure enabling reproduced third-party verification.

Second Technical Improvement—Cryptographic Proof Structure Binding Authorization Decisions to Runtime Context. The present disclosure generates a cryptographic proof structure—also referred to as a verifiable execution receipt or verification artifact—that cryptographically binds an authorization decision, an authority artifact identifier, a runtime context digest, an evidence reference set, and a rationale code set into a signed data structure. The specific technical effect is creation of a tamper-evident, independently verifiable chain of custody for every machine execution, enabling post-hoc forensic reconstruction of the exact conditions under which each execution was authorized. A system that generates an audit token without a runtime context digest computed from a canonical representation of evaluated runtime inputs, or that does not expose sufficient information to enable reproduced digest computation, cannot achieve this technical effect and cannot enable the independent reproduced verification that distinguishes the present disclosure from prior art logging and security information and event management (SIEM) systems.

Third Technical Improvement—Prevention of Unauthorized Execution Under Compromised Identity Conditions. The present disclosure prevents unauthorized execution under compromised identity conditions by requiring that integrity evidence be validated at time-of-use against proof obligations encoded in the authority artifact. A compromised machine entity that holds valid credentials but whose platform integrity has been violated cannot satisfy the proof obligations and is denied execution or placed in degraded mode. The specific technical effect is a structural reduction in the execution window available to a compromised machine entity, bounded by evidence freshness requirements, without requiring revocation of credentials.

Fourth Technical Improvement—Latency-Bounded Constraint Evaluation with Race Condition Handling. The present disclosure provides a latency-bounded constraint evaluation mechanism in which the enforcement point evaluates execution constraints within a specified maximum evaluation latency and handles race conditions arising from concurrent execution requests against shared resource state preconditions. The specific technical effect is deterministic, time-bounded enforcement decisions compatible with real-time distributed system operation, producing cryptographic proof structures including evaluation timing metadata enabling verification that constraint evaluation completed within authorized latency bounds. A system that ignores timing guarantees and does not produce verifiable timing evidence bound to individual execution decisions cannot substitute for the present disclosure in deployment contexts requiring real-time execution governance with verifiable timing compliance.

Fifth Technical Improvement—Portable Constraint Language with Heterogeneous Compilation. The present disclosure provides a portable constraint language—also referred to herein as a portable constraint representation—and compilation subsystem translating constraint specifications into deterministic enforcement-point-specific rule formats with canonical constraint digests enabling independent confirmation of faithful implementation across heterogeneous infrastructure. A system that deploys constraints only to a single enforcement component type, or that separates enforcement, verification, and logging into entirely independent components without a unifying cryptographic proof structure binding all three, cannot achieve the end-to-end verifiability that the present disclosure provides.

The foregoing technical improvements are specific, concrete, and rooted in the technical functioning of computer systems. They are not directed to abstract ideas, mathematical relationships, methods of organizing human activity, or mental processes. Each improvement is achieved through specific machine operations on specific data structures producing specific technical outputs.

DEFINITIONS OF KEY TERMS AND PROTOCOL CATEGORY

As used herein, "execution authority" means the machine-enforceable authorization of a specific computational operation by a specific machine entity at a specific instant in time, subject to: (a) a cryptographically verified scope and permission boundary; (b) satisfaction of runtime constraints evaluated with consistent, reproducible outcomes against current machine and operational state at the time of execution; and (c) validation of integrity evidence demonstrating the current security posture of the executing machine entity—where all three conditions are evaluated and enforced by a dedicated enforcement point at the time of execution, and where the outcome is recorded in a cryptographic proof structure. Execution authority is distinct from access authorization, authentication, and audit logging as defined herein.

As used herein, "consistent and reproducible evaluation" or "reproducible constraint evaluation" means evaluation of an execution constraint set against a runtime context that produces a consistent outcome for any given constraint set and runtime context input pair, independent of evaluation time, evaluating entity, or implementation, such that an independent party presented with the same constraint set and runtime context will compute the same evaluation outcome and the same constraint evaluation digest. Consistent and reproducible evaluation expressly includes deterministic evaluation and encompasses any evaluation mechanism—including but not limited to rule-based evaluation, compiled policy execution, and formal constraint checking—that produces a reproducible, verifiable outcome. A probabilistic or heuristic evaluation mechanism that may produce different outcomes for the same inputs does not constitute consistent and reproducible evaluation within the meaning of this disclosure. As used herein, "verifiably consistent outcomes" or "verifiably consistent evaluation" means evaluation outcomes that, while not strictly deterministic, are verifiably equivalent such that an independent party can confirm equivalence of evaluation results through a defined verification procedure, and expressly includes consistent and reproducible evaluation as defined herein.

As used herein, "cryptographic proof structure" means a machine-readable data structure generated by an enforcement point that cryptographically binds an authorization decision to an authority artifact identifier and a runtime context digest in a manner enabling an independent third party to reproduce at least one cryptographic digest from reproduced inputs and confirm, through signature validation and digest comparison alone, that the enforcement point performed authority-compliant execution, without requiring access to the enforcement point's internal state, logs, or configuration. The term "cryptographic proof structure" is used interchangeably herein with "verifiable execution receipt," "verification artifact," and "execution authorization record." A data structure denominated an "audit token," "log entry," or "event record" constitutes a cryptographic proof structure within the meaning of this disclosure if it satisfies the foregoing functional definition regardless of denomination.

As used herein, "canonicalization function" means a function that transforms a runtime context or other input into a canonical representation such that semantically equivalent inputs regardless of field ordering, data type encoding, whitespace, or serialization format-produce identical output, enabling independent parties to compute identical cryptographic digests from reproduced inputs. The specific algorithm used by a canonicalization function is not limiting provided it satisfies this consistency requirement.

As used herein, "distributed enforcement" means enforcement of execution authority across a plurality of cooperating enforcement point components in which at least two of the following operations are performed by separate components: constraint evaluation; integrity evidence validation; execution control decision; cryptographic proof structure generation; and receipt verification. Distributed enforcement expressly encompasses architectures that separate enforcement, verification, and logging functions across distinct infrastructure components, provided that a cryptographic proof structure generated by or derivable from the cooperating components enables end-to-end reproduced verification of the authorization decision.

The Autonomous Machine Identity and Authority Protocol (AMIAP), also referred to as the Verifiable Execution and Enforcement Protocol (VEXEP) or the Execution Authority Protocol (XAP), defines a new foundational protocol category—the Execution Authority Protocol category—governing the complete lifecycle of execution authority. This protocol category is non-overlapping with authentication, authorization delegation, and channel security protocol categories, each of which governs a distinct technical function. The execution authority protocol category governs execution-time constraint enforcement with bounded latency, runtime integrity validation, and cryptographic proof structure generation—none of which any prior protocol category provides.

BRIEF DESCRIPTION OF THE DRAWINGS

The accompanying drawings are incorporated herein by reference and illustrate non-limiting embodiments of the invention.

FIG. 2 is a block diagram of a Machine Authority Token (MAT) (120) comprising machine identity field (122), execution scope field (124), permission boundary field (126), trust vector field (128), integrity proof obligations field (130), execution constraints field (132), delegation rights field (134), issuer identity and signature field (136), and replay protection and expiry field (138).

DETAILED DESCRIPTION OF THE PREFERRED EMBODIMENTS

Figure 1:
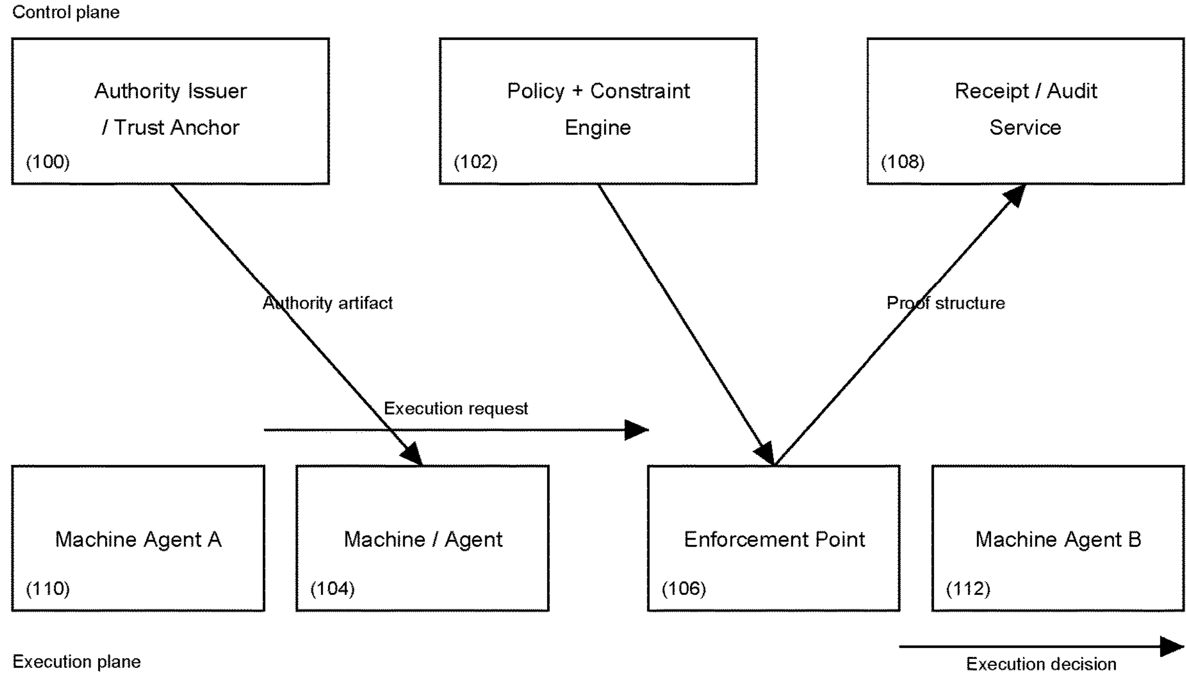
FIG. 1 is a block diagram of the system architecture comprising authority issuer and trust anchor (100), policy and constraint engine (102), machine or agent entity (104), enforcement point (106), receipt and audit service (108), Machine Agent A (110), and Machine Agent B (112).

The following detailed description sets forth specific embodiments of the invention with reference to the accompanying drawings. Like reference numerals designate corresponding parts. Embodiments are illustrative and non-limiting; features may be combined in any technically feasible manner. The claimed invention achieves the specific technical improvements described in the Statement of Specific Technical Improvements through the specific technical mechanisms described herein.

I. SYSTEM ARCHITECTURE AND TECHNICAL OPERATION

Referring to FIG. 1, the system implements a deterministic execution control protocol for distributed autonomous systems. The authority issuer and trust anchor (100) generates and cryptographically signs authority artifacts. The policy and constraint engine (102) defines and maintains constraint semantics and policy rules. Machine agents (104, 110, 112) request and present authority artifacts. Enforcement points (106) perform signature verification, scope and boundary checking, reproducible constraint evaluation, integrity evidence validation, execution control, and cryptographic proof structure generation. The receipt and audit service (108) stores and enables independent reproduced verification of cryptographic proof structures.

The critical technical distinction from conventional access control systems is the enforcement point's operation at execution time with reproducible constraint evaluation. The enforcement point evaluates the specific requested operation against a constraint set sensitive to runtime machine state-current network zone, time, device posture, resource state, risk score and validates current platform integrity evidence at the moment of execution. This produces a ternary decision backed by a cryptographic proof structure enabling independent third-party verification, achieving prevention of unauthorized execution under compromised identity conditions.

II. AUTHORITY ARTIFACT STRUCTURE

Referring to FIG. 2, a Machine Authority Token (MAT) (120) is a cryptographically signed data structure encoding the complete execution authority grant. The machine identity field (122) binds the artifact to a specific machine entity through a public key, certificate reference, hardware attestation-bound identifier, or composite multi-anchor identifier. The execution scope field (124) defines permitted operations as a bounded structured enumeration or policy expression. The permission boundary field (126) encodes hard limits-maximum impact bound, maximum privilege delta bound, resource quotas, and exclusion lists-a strict ceiling enforced by derivation proof validation. The trust vector field (128) encodes a quantitative or qualitative trust assessment. The integrity proof obligations field (130) specifies categories and freshness requirements of integrity evidence. The execution constraints field (132) encodes runtime conditions evaluated at time of execution, expressed in a portable constraint language. The delegation rights field (134) specifies delegation permissions and depth. The issuer identity and signature field (136) comprises issuer identifier and cryptographic signatures over canonical serialization. The replay protection and expiry field (138) encodes validity interval, nonce, and instance identifier.

In certain embodiments, the authority artifact is embodied as a Machine Authority Token (MAT), and references herein to an authority artifact expressly include MAT embodiments as well as structurally equivalent artifacts irrespective of denomination, field ordering, encoding format, or storage topology.

III. AMIAP PROTOCOL HANDSHAKE

Figure 3:
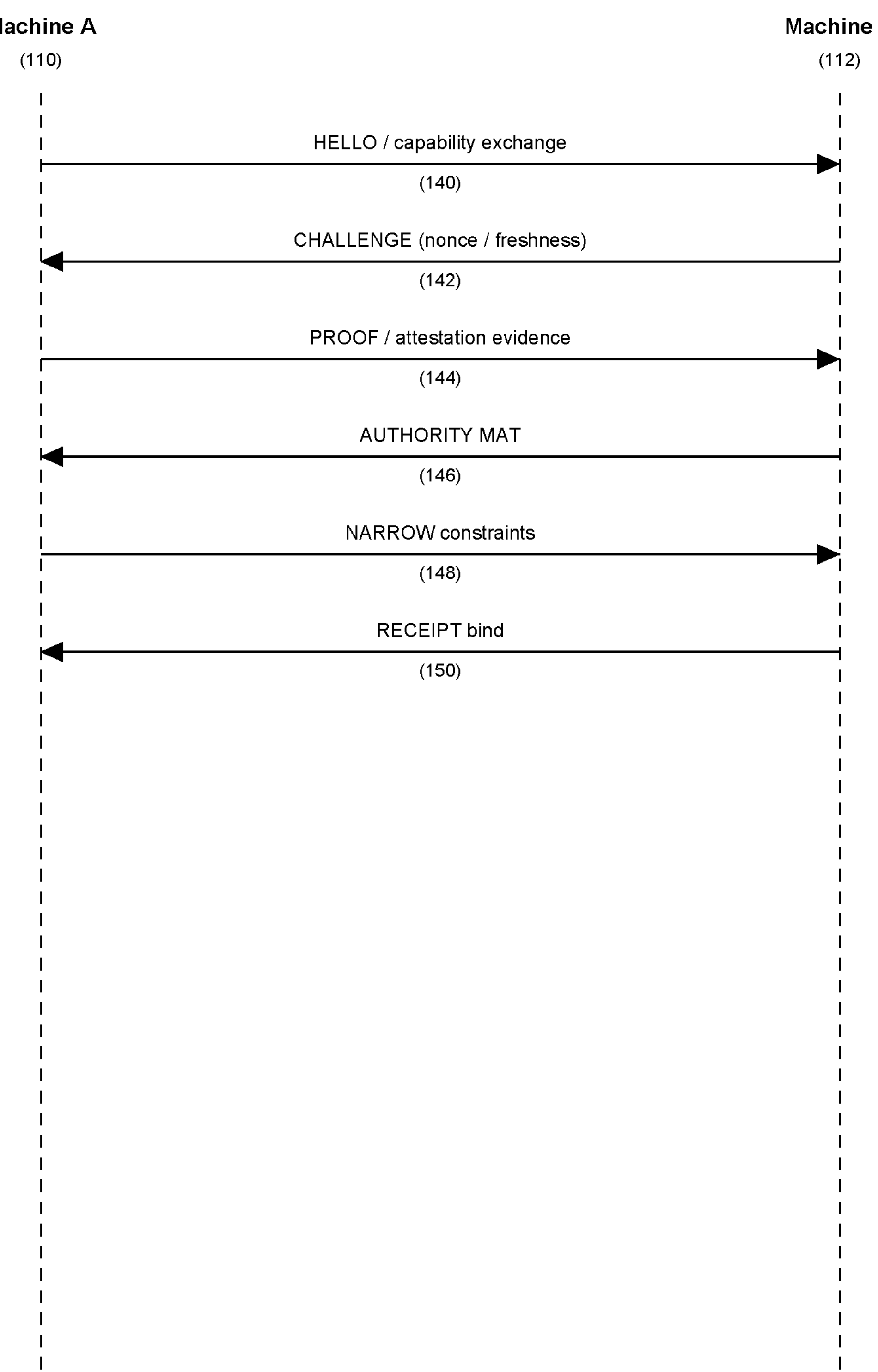
FIG. 3 is a sequence diagram of the AMIAP protocol handshake comprising capability exchange (140), challenge (142), proof and attestation (144), authority artifact issuance (146), constraint narrowing negotiation (148), and receipt binding confirmation (150).

Referring to FIG. 3, the handshake proceeds through capability exchange (140), challenge (142) comprising a session-binding nonce, proof submission (144) of integrity evidence bound to the challenge, authority conveyance (146) of the signed MAT, constraint negotiation (148) enforcing the monotonic constraint rule under which no message may relax constraints or expand boundaries, and receipt binding (150) conveying the cryptographic proof structure upon execution completion. The challenge message constitutes a freshness challenge comprising at least one nonce, timestamp, or sequence identifier that binds responsive integrity evidence to the specific execution request session, thereby preventing replay of previously presented proof messages. In certain embodiments, the protocol processing sequences governing the handshake are implemented using state machines as described in Section XVIII-A.

IV. ENFORCEMENT PIPELINE

Figure 4:
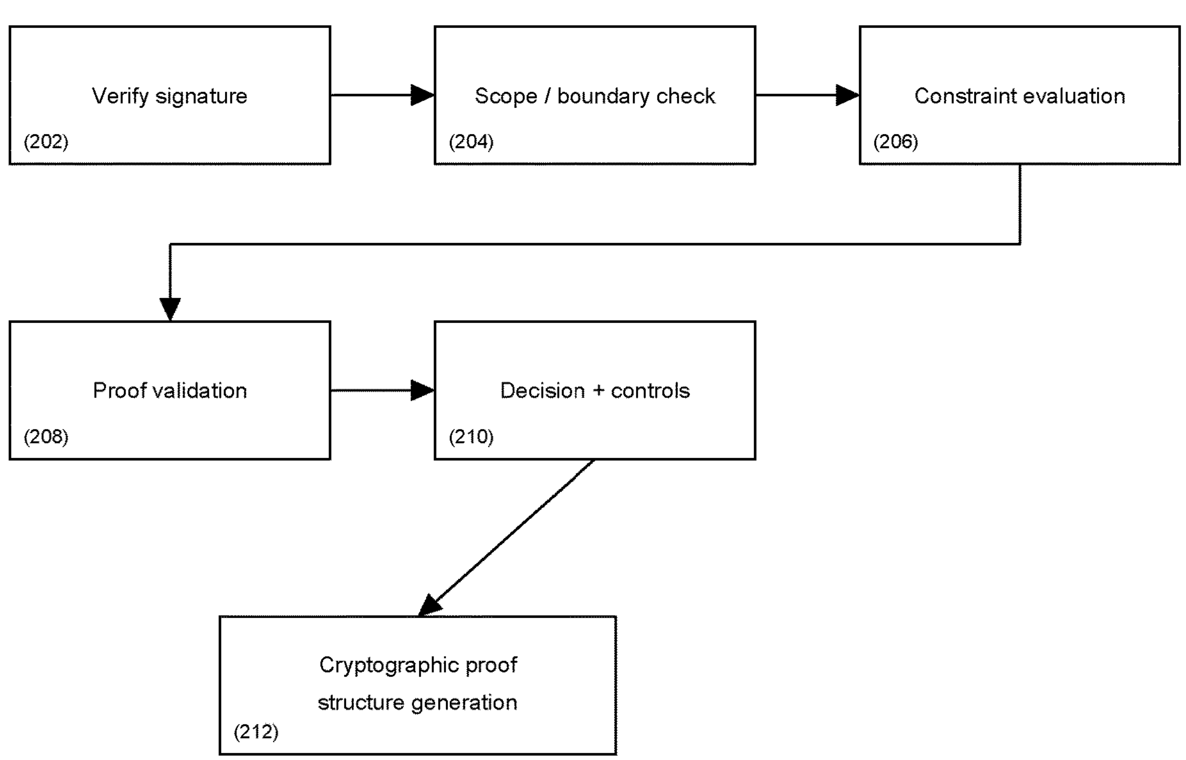
FIG. 4 is a flow diagram of the enforcement pipeline comprising signature verification (202), scope and boundary check (204), constraint evaluation (206), proof validation (208), execution decision and controls application (210), and cryptographic proof structure generation (212).

Referring to FIG. 4, the enforcement point executes a deterministic multi-stage pipeline constituting the core technical mechanism of the invention. In certain embodiments, the processing sequence of the enforcement pipeline is implemented using state machines as described in Section XVIII-A, including the Authorization Processing State Machine and the Authority Artifact Validation State Machine.

Signature verification (202): The MAT's cryptographic signature is verified against the configured trust anchor set. Failure causes unconditional denial.

Scope and boundary check (204): The requested action is verified against execution scope and permission boundary. Violation causes unconditional denial regardless of constraint evaluation outcome.

Constraint evaluation (206): The compiled constraint rule set is evaluated against the runtime context obtained at execution time with consistent, reproducible outcomes. The enforcement point emits a rationale code for each evaluated constraint identifying the constraint and its binary evaluation outcome. The evaluation produces the same outcome for identical inputs regardless of the evaluating entity.

Proof validation (208): Integrity evidence is validated against proof obligations including freshness evaluation at execution time. Failure causes denial or degraded-mode operation.

Decision and controls application (210): The enforcement point makes a ternary execution control decision. Applied controls include throttling, sandboxing, canary execution, step-up proof requirement, parameter redaction, post-action verification, rollback conditioning, and co-signature requirements.

Cryptographic proof structure generation (212): A cryptographic proof structure—also referred to as a verifiable execution receipt or verification artifact—is generated comprising authority artifact identifier, authorization decision, runtime context digest, rationale codes, evidence reference set, policy digest, evaluation timing field, and enforcement point cryptographic signature. This structure enables third-party reproduced verification.

IV-A. Latency-Bounded Constraint Evaluation and Race Condition Handling

Figure 4A:
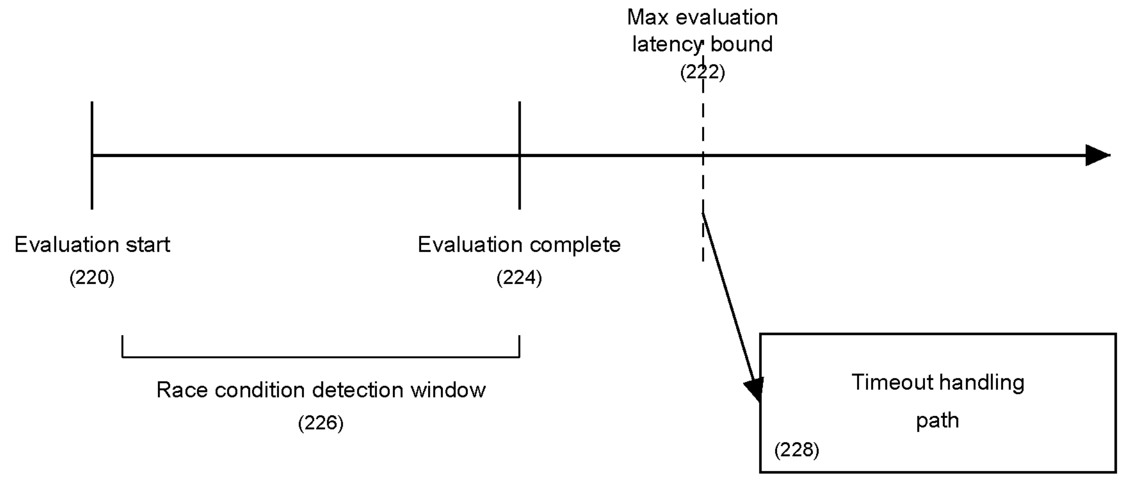
FIG. 4A is a timing diagram of latency-bounded constraint evaluation comprising evaluation start event (220), maximum evaluation latency bound (222), evaluation completion event (224), race condition detection window (226), and evaluation timeout handling path (228).

Referring to FIG. 4A, in certain embodiments the enforcement point performs constraint evaluation subject to a maximum evaluation latency bound (222) specified in the authority artifact or enforcement point configuration. The evaluation starts event (220) marks initiation of constraint evaluation. The enforcement point completes evaluation and emits an execution decision before the maximum evaluation latency bound expires.

If constraint evaluation does not complete within the maximum evaluation latency bound, the enforcement point executes a timeout handling path (228) comprising one of: entering degraded mode with scope restriction; issuing a denial with a timeout rationale code; or suspending execution pending recovery. The selected timeout behavior is configurable per constraint type.

The cryptographic proof structure generated upon evaluation completion includes an evaluation timing field recording elapsed evaluation time from start event (220) to completion event (224). This timing metadata enables independent verifiers to confirm constraint evaluation completed within the authorized latency bound.

In distributed enforcement architectures comprising multiple cooperating enforcement points evaluating constraints over shared resource state, race conditions arise when concurrent execution requests present overlapping resource state preconditions. In certain embodiments, the enforcement point implements a constraint evaluation serialization mechanism comprising one of: an optimistic concurrency control protocol in which the enforcement point computes a resource state digest at the time of constraint evaluation—wherein the resource state digest is a cryptographic hash of a canonical representation of the relevant resource state variables evaluated at evaluation time—and includes the resource state digest in the cryptographic proof structure for subsequent consistency verification; a pessimistic locking protocol in which the enforcement point acquires a distributed lock over contested resource state before evaluating resource state precondition constraints; or a speculative evaluation protocol in which the enforcement point evaluates constraints speculatively and includes a speculative evaluation flag in the cryptographic proof structure pending confirmation of resource state consistency.

The race condition detection window (226) is a configurable time interval during which the enforcement point monitors for competing execution requests against the same resource state precondition. If a competing request is detected, the enforcement point applies a conflict resolution policy: serializing to the earlier-timestamped request; applying backoff and retry; or denying both requests and requiring re-issuance. All race condition detections and resolutions are recorded in the cryptographic proof structure with corresponding rationale codes.

The latency-bounded constraint evaluation and race condition handling mechanisms provide specific technical improvements—deterministic time-bounded execution decisions and serialized concurrent resource state governance—not achievable through conventional policy engines, security orchestration platforms, or access control systems.

V. MONOTONIC DELEGATION

Figure 5:
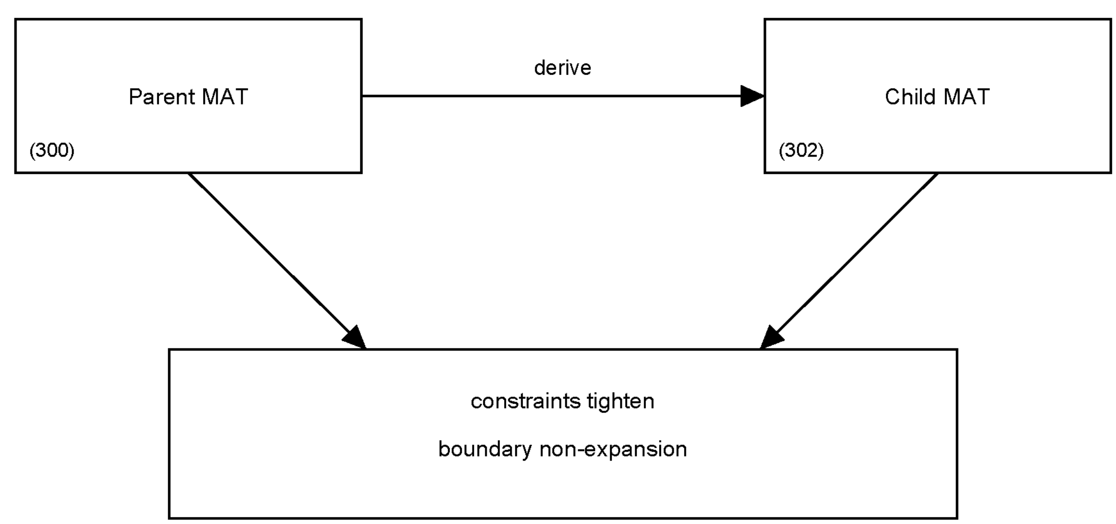
FIG. 5 is a block diagram of monotonic delegation from Parent MAT (300) to Child MAT (302), annotated with the monotonic constraint tightening invariant and the permission boundary non-expansion invariant.

Referring to FIG. 5, derivation of a Child MAT (302) from a Parent MAT (300) is governed by four cryptographically enforced invariants: (i) child scope is a subset of parent scope; (ii) child permission boundary is equal to or more restrictive; (iii) each child constraint is equal to or stricter than the corresponding parent constraint; and (iv) child proof obligations include all parent obligations. Enforcement points unconditionally reject derived artifacts failing derivation proof validation.

VI. TRUST FEDERATION

Figure 6:
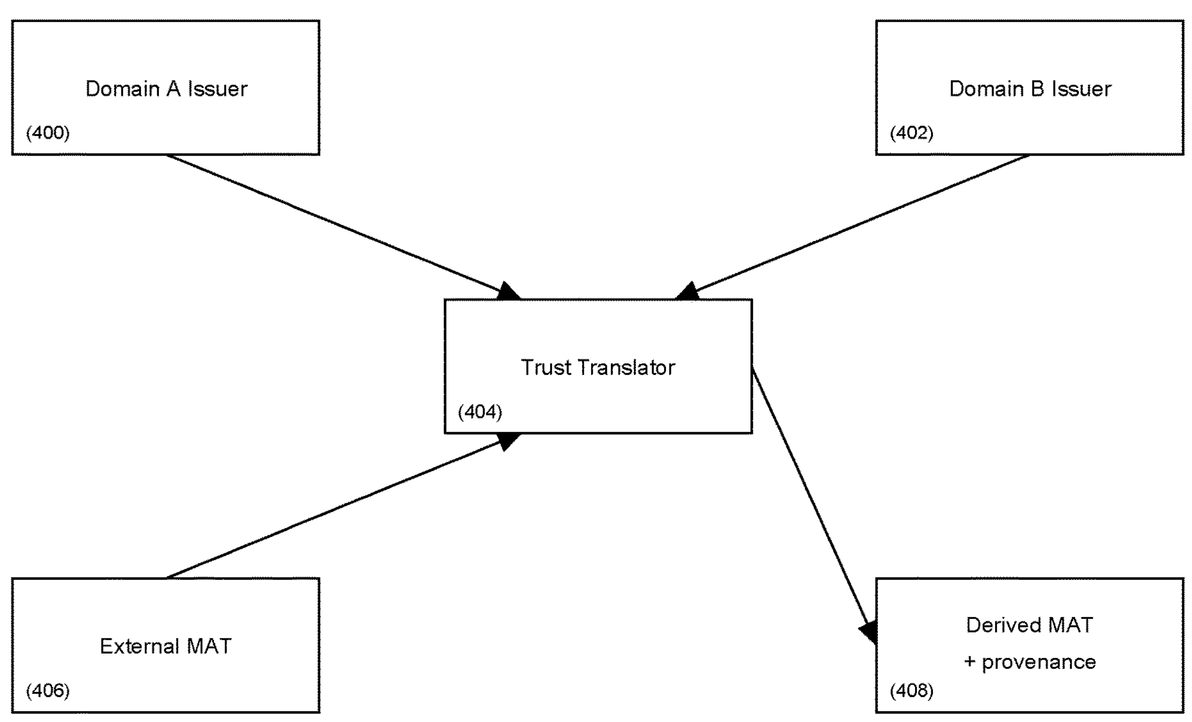
FIG. 6 is a block diagram of cross-domain trust federation comprising Domain A Issuer (400), Domain B Issuer (402), Trust Translator (404), External MAT (406), and Derived MAT with provenance references (408).

Referring to FIG. 6, a Trust Translator (404) translates an External MAT (406) from Domain A Issuer (400) into a Domain B Derived MAT (408), embedding provenance references and applying additional local constraints that tighten but do not relax the external artifact's constraint set.

VII. HARDWARE-BOUND AUTHORITY

Figure 7:
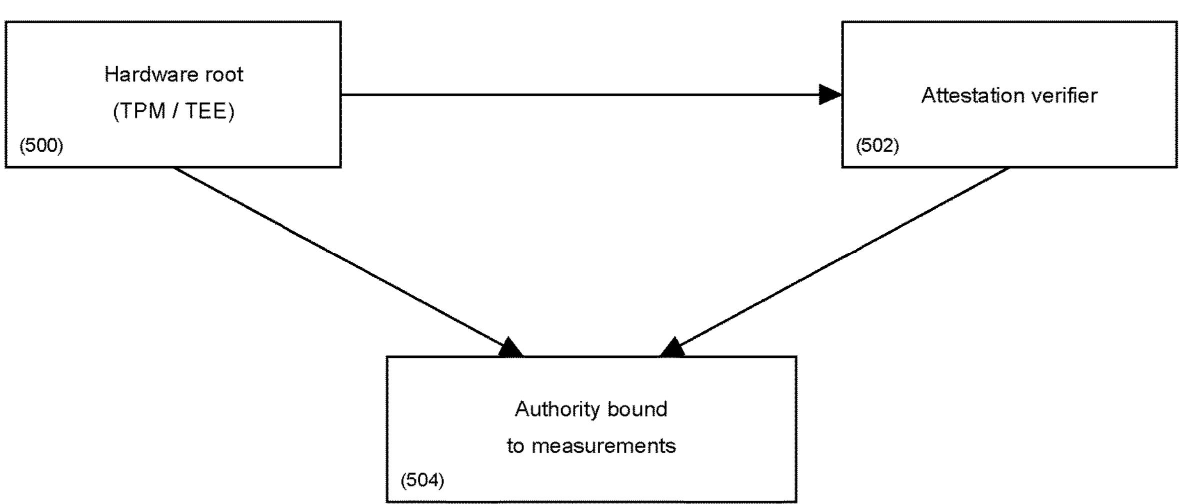
FIG. 7 is a block diagram of hardware-bound authority comprising hardware root of trust (500), attestation verifier (502), and authority bound to hardware measurements (504).

Referring to FIG. 7, hardware-bound embodiments bind the MAT to a hardware root of trust-a Trusted Platform Module (TPM) or Trusted Execution Environment (TEE) (500)—validated by an attestation verifier (502). Enforcement points require fresh attestation evidence (504) satisfying freshness requirements before permitting privileged execution.

AI Agent Commitment Binding (Expanded)

Figure 8:
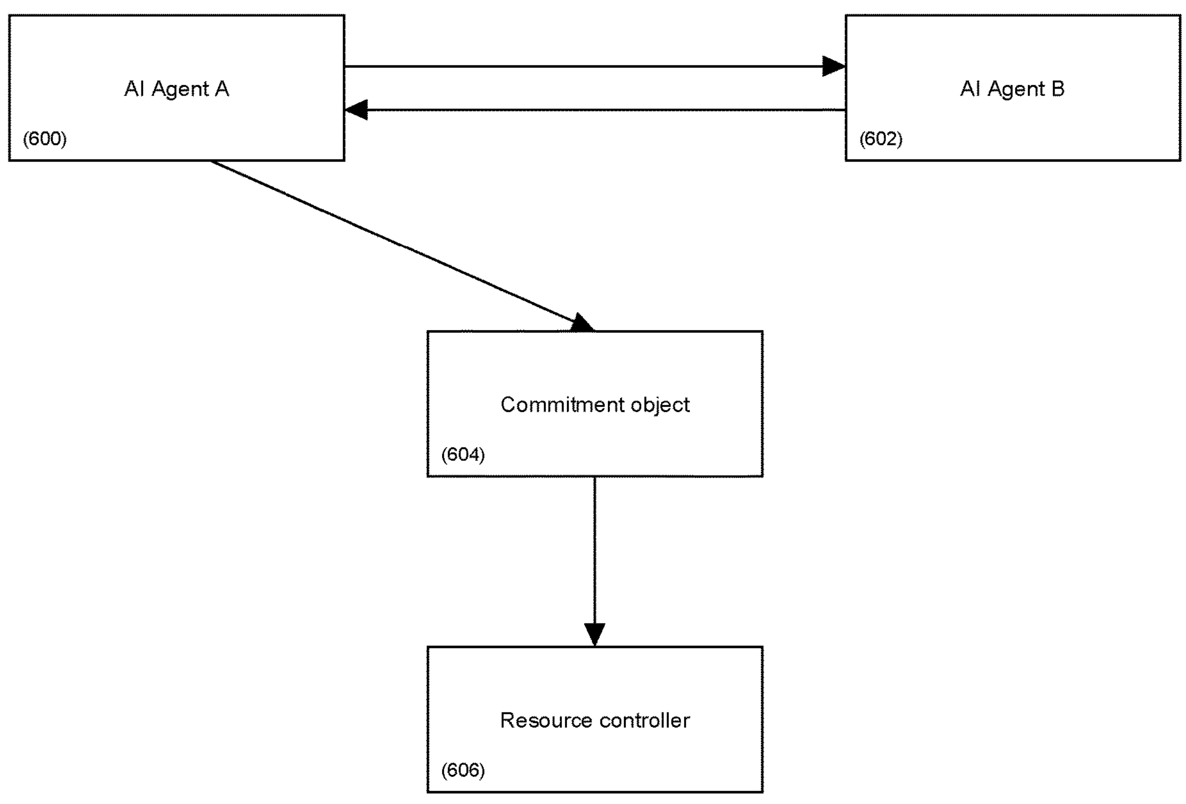
FIG. 8 is a block diagram of AI agent commitment binding comprising AI Agent A (600), AI Agent B (602), commitment object (604), and resource controller (606).

Referring to FIG. 8, a commitment object (604) cryptographically bound to the authority artifact identifier and constraint digests governs AI agent execution. A resource controller (606) blocks actions outside commitment scope or authority boundary. Commitment digests are included in the cryptographic proof structure. In certain embodiments, the resource controller processes the execution session according to a commitment binding processing sequence as further described herein. The commitment object (604) is generated by an autonomous agent or AI system prior to initiating the execution session, the commitment object comprising a declared action set encoding the bounded set of action types the agent declares it will propose, a commitment binding field cryptographically referencing the authority artifact identifier and a constraint digest computed from the authority artifact's constraint set, an agent identity field binding the commitment object to the generating agent, a session identifier, a temporal validity field, and a commitment object signature binding all foregoing fields. Upon receiving each proposed action from the autonomous agent, the resource controller evaluates the proposed action against the declared action set with consistent, reproducible, or verifiably consistent outcomes, and evaluates the proposed action against the execution scope and permission boundary of the governing authority artifact. Upon completion of each action, the enforcement point generates a cryptographic proof structure comprising a commitment digest computed as a cryptographic hash of a canonical representation of the commitment object, a commitment compliance field recording the per-evaluation outcomes for each evaluation performed at the time of proposal—comprising a commitment check outcome, a scope check outcome, a boundary check outcome, and a constraint evaluation outcome—and an enforcement point cryptographic signature binding the commitment digest and commitment compliance field together with the authority artifact identifier, authorization decision indicator, and runtime context digest. The commitment compliance field and commitment digest together enable an independent verifier to confirm, from the cryptographic proof structure alone and without access to resource controller or enforcement point internal state, that each executed action was evaluated against a commitment object cryptographically bound to the governing authority artifact at the time of proposal. In certain embodiments comprising multi-agent architectures, a second autonomous agent (AI Agent B, 602) generates a derived commitment object including a provenance reference identifying AI Agent A's (600) authority artifact identifier and commitment digest; the resource controller for the second agent validates that the second commitment object's declared action set is within the scope permitted by the first commitment object's declared action set and within the second governing authority artifact's execution scope and permission boundary; and each action executed by the second agent produces a cryptographic proof structure comprising a provenance chain field enabling an independent verifier to reconstruct the complete multi-agent commitment derivation from proof structures alone.

IX. AUTONOMOUS DEFENSE AND TIERED AUTONOMY

Figure 9:
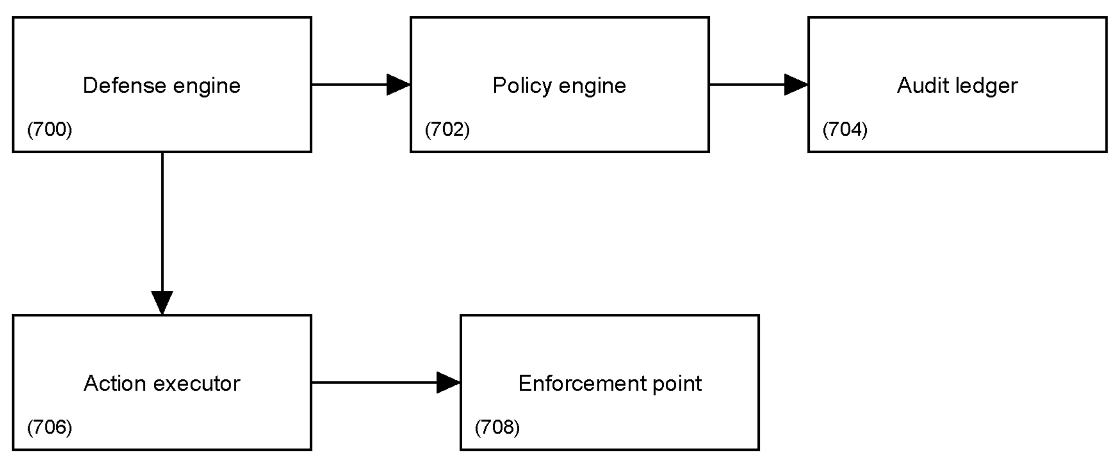
FIG. 9 is a block diagram of the autonomous defense engine comprising defense engine (700), policy engine (702), audit ledger (704), action executor (706), and enforcement point (708).

Referring to FIG. 9, the autonomous defense engine (700) executes autonomous defensive responses under AMIAP governance through tiered autonomy levels. All defensive actions are subject to authority artifact validation, constraint evaluation, and cryptographic proof structure generation.

X. CONSTRAINT LANGUAGE COMPILATION

Figure 10:
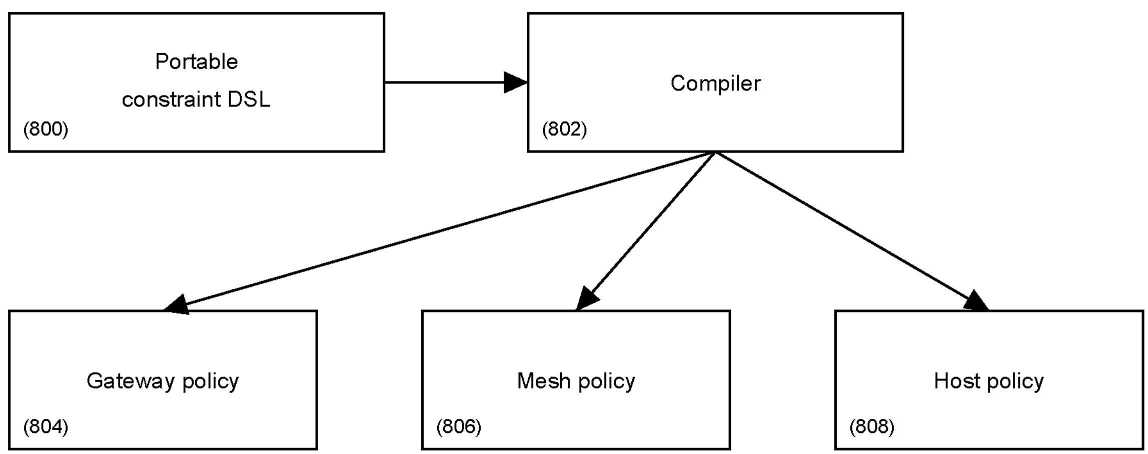
FIG. 10 is a block diagram of constraint language compilation comprising portable constraint DSL (800), compiler (802), gateway policy (804), service mesh policy (806), and host policy (808).

Referring to FIG. 10, the constraint compilation subsystem translates a portable constraint language (800) through a compiler (802) into gateway policy rules (804), service mesh sidecar policies (806), and host-level agent policies (808), generating canonical constraint digests enabling independent verifiers to confirm faithful implementation.

XI. CRYPTOGRAPHIC PROOF STRUCTURE CHAINING AND VERIFICATION

Figure 11:
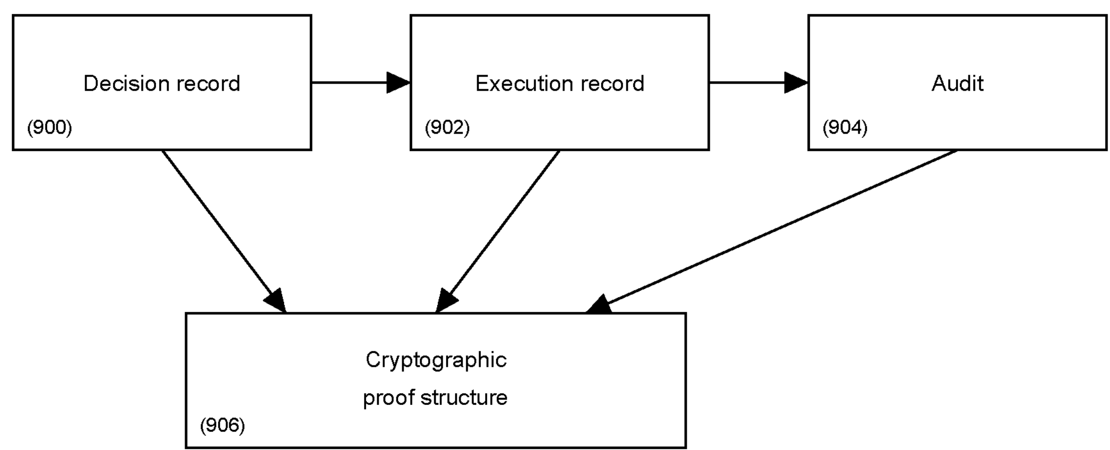
FIG. 11 is a block diagram of cryptographic proof structure chaining and verification comprising decision record (900), execution record (902), audit record (904), and receipt binding hashes and context (906).

Referring to FIG. 11, sequential cryptographic proof structures are linked through prior receipt hashes (900, 902, 904) anchored to an append-only audit log (906). Independent verifiers reproduce context and constraint evaluation digests, validate signatures, and emit verification outputs confirming authority-compliant execution without enforcement point access. A system that separates the enforcement component from the verification component and the logging component implements distributed enforcement within the meaning of this disclosure, provided that a cryptographic proof structure generated by or derivable from those components enables end-to-end reproduced verification.

XII. DEGRADED MODE AND REFRESH

Figure 12:
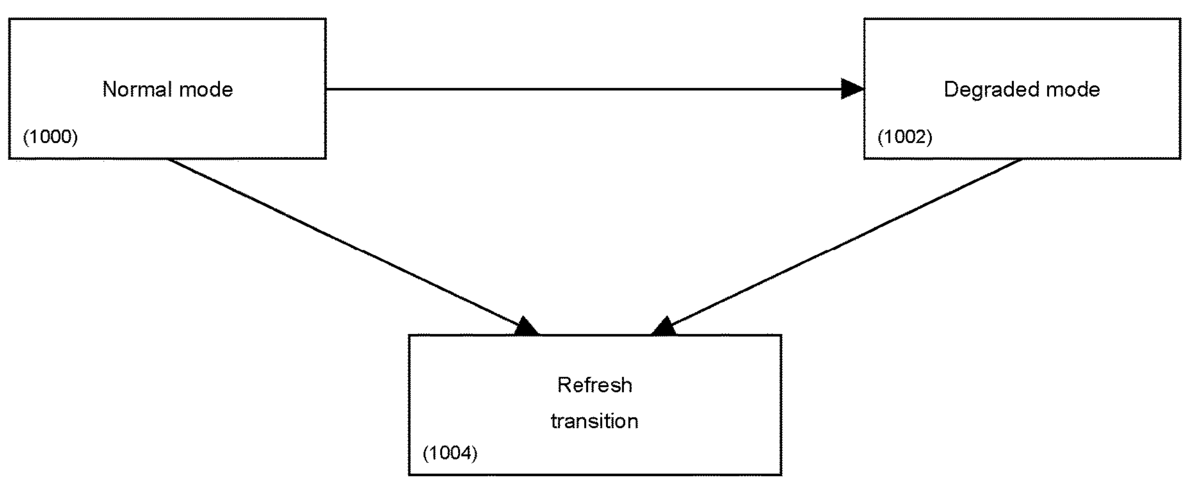
FIG. 12 is a block diagram of degraded mode comprising normal mode (1000), degraded mode (1002), and refresh transition (1004).

Referring to FIG. 12, degraded mode (1002) applies when integrity evidence is unavailable, stale, or invalid: execution scope is restricted, constraints are tightened beyond nominal values, time-to-live is shortened, and additional approvals may be required. This prevents fail-open operation. Refresh (1004) restores full authority upon successful re-attestation.

XIII. REVOCATION AND REFRESH STATE MACHINE

Figure 13:
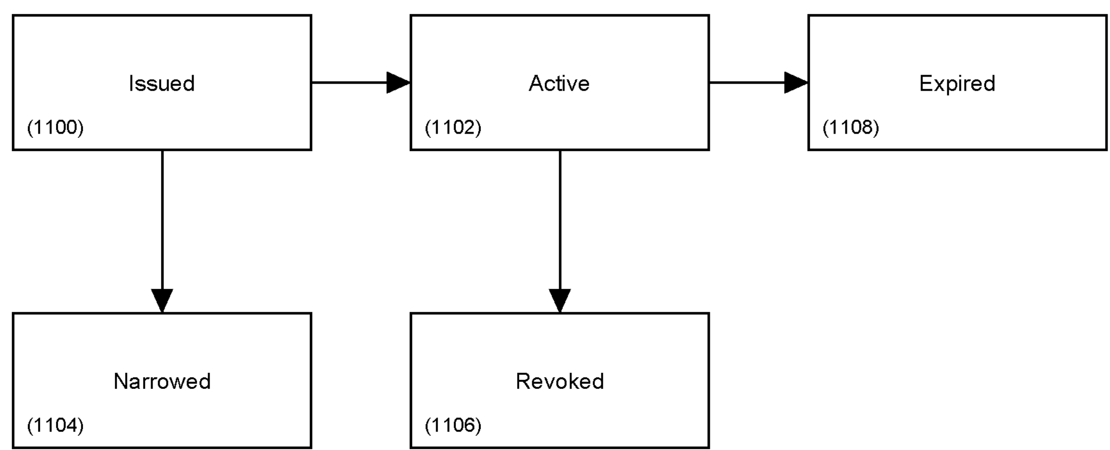
FIG. 13 is a state diagram of the revocation and refresh state machine comprising states Issued (1100), Active (1102), Narrowed (1104), Revoked (1106), and Expired (1108).

Referring to FIG. 13, authority artifact lifecycle states comprise Issued (1100), Active (1102), Narrowed (1104), Revoked (1106), and Expired (1108). Revocation triggers include anomaly detection, key compromise suspicion, policy change, and risk threshold exceedance. Revoked and expired artifacts are unconditionally rejected.

XIV. KEY MANAGEMENT AND TRUST ANCHORS

Figure 14:
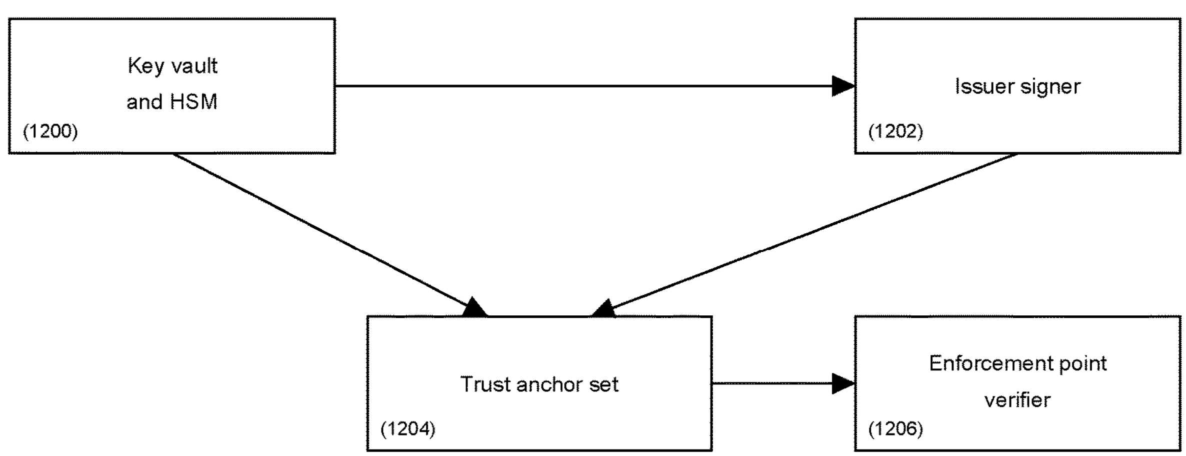
FIG. 14 is a block diagram of key management comprising key vault and hardware security module (HSM) (1200), issuer signer (1202), trust anchor set (1204), and enforcement point verifier (1206).

Referring to FIG. 14, signing key operations are performed within a hardware security module (1200). Trust anchor sets (1204) are distributed to enforcement point verifiers (1206) through a secure provisioning and rotation protocol.

XV. THREAT MODEL

Figure 15:
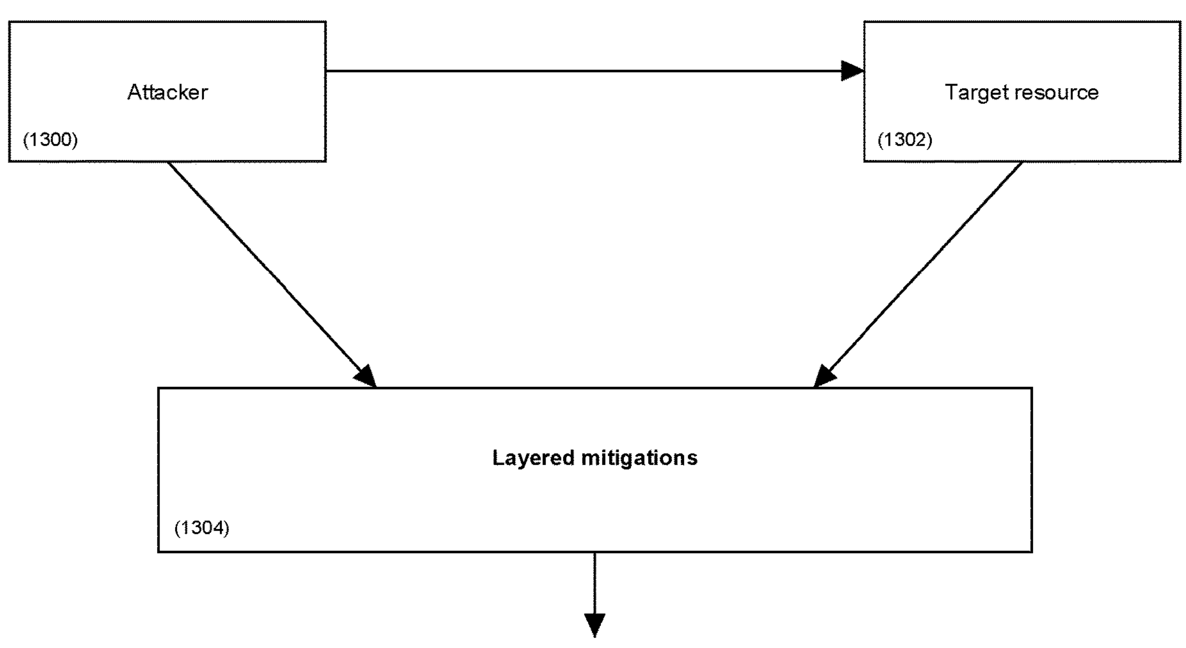
FIG. 15 is a block diagram of the threat model comprising attacker (1300), target resource (1302), and layered mitigations (1304).

Referring to FIG. 15, layered mitigations (1304) address credential theft and replay, scope escalation, constraint bypass, proof spoofing, context tampering, AI tool misuse, audit tampering, cross-domain confusion, policy drift, and distributed bypass attempts. A specific mitigation against competitors splitting enforcement, verification, and logging into separate non-cryptographically linked components is provided by the requirement that the cryptographic proof structure bind all authorization decision inputs such that end-to-end reproduced verification is possible regardless of architectural separation.

XVI. COMPLIANCE EVIDENCE SUPPORT

The cryptographic proof structure architecture provides compliance evidence for SOC 2 Security (System and Organization Controls 2), ISO/IEC 27001, NIST (National Institute of Standards and Technology) SP 800-53, NIST SP 800-207 zero-trust architecture, and AI safety and governance frameworks. The foregoing mappings are illustrative and non-limiting.

XVII. ADDITIONAL EMBODIMENTS

In one embodiment, authority artifacts support multi-scope encoding addressable to different enforcement point types, enabling a single MAT to govern execution across application programming interface (API) gateways, mesh sidecars, host agents, CI/CD controllers, and device controllers including Internet of Things (IoT) device controllers simultaneously.

In one embodiment, authority artifacts require signatures from multiple issuing authorities, enabling joint authorization governance for high-risk cross-organizational operations.

In one embodiment, cryptographic proof structures employ selective disclosure by omitting sensitive execution parameters and including cryptographic hashes in their place, preserving verifiability without disclosing raw parameter values.

In one embodiment, step-up proofs are dynamically required when a runtime risk score exceeds a configurable threshold without artifact re-issuance.

In one embodiment, delegation chains are validated for acyclicity, preventing formation of cyclic authorization graphs.

In one embodiment, quorum signatures from M-of-N authorized approvers are required for delegation operations above a configurable sensitivity threshold.

In one embodiment, dispute workflows enable a challenging party to obtain a co-signed verification statement from an independent verifier service.

In one embodiment, the enforcement point includes in the cryptographic proof structure a constraint compilation digest identifying the canonical constraint representation applied during evaluation.

In one embodiment, the maximum evaluation latency bound is expressed as a constraint field in the authority artifact, enabling issuers to specify real-time evaluation requirements on a per-artifact basis.

In one embodiment, speculative evaluation outcomes and confirmation latency are recorded in the cryptographic proof structure, enabling analysis of optimistic concurrency control performance across distributed enforcement deployments.

In one embodiment, a verification artifact generated by the enforcement point omits the raw runtime context values and includes only the runtime context digest and the rationale code set, enabling privacy-preserving verification where the verifier confirms authorization compliance without access to sensitive runtime parameters.

In one embodiment, execution authorization records are generated in a compact form comprising only the minimum fields required for reproduced verification-authority artifact identifier, runtime context digest, rationale codes, and enforcement point signature-enabling high-throughput machine-to-machine execution environments where storage and transmission overhead of full receipt structures is a constraint.

XVIII. PROTOCOL MESSAGE GRAMMAR (NON-LIMITING EMBODIMENTS)

In certain embodiments, the Autonomous Machine Identity and Authority Protocol (AMIAP), also referred to as the Execution Authority Protocol (XAP), defines a machine-to-machine communication grammar governing the structured exchange of execution authority information, integrity evidence, constraint negotiation data, and cryptographic proof structures between participating entities. The protocol grammar provides a semantic framework for message construction and interpretation while remaining agnostic to underlying serialization formats, transport mechanisms, or encoding schemes.

The protocol message grammar is defined in terms of message roles, semantic fields, and processing requirements, rather than any specific wire format. Messages may be represented in any machine-readable encoding, including binary encodings, structured text encodings, or compact canonical representations, provided that the semantic content described herein is preserved.

A. Message Taxonomy

In certain embodiments, the protocol comprises the following non-limiting message types: Capability Message conveying supported protocol features; Challenge Message comprising a freshness element binding subsequent proof messages to a specific session and preventing replay; Proof Message comprising integrity evidence cryptographically bound to the freshness element; Authority Message comprising a signed authority artifact; Constraint Negotiation Message proposing constraint modifications subject to the monotonic constraint rule; Execution Request Message requesting execution of a computational operation; Execution Decision Message indicating permit, deny, or permit-with-controls; and Receipt Message comprising a cryptographic proof structure binding an authorization decision to an authority artifact identifier and a runtime context digest. In certain embodiments supporting the commitment layer described in Section VIII herein and in the commitment layer semantic fields disclosure of Section XVIII, the protocol further comprises the following non-limiting message types: a Commitment Object Message conveying a commitment object generated by an autonomous agent, the commitment object being cryptographically bound to the governing authority artifact identifier and constraint digest and declaring the agent's intended action set for the execution session; a Commitment Validation Message generated by the resource controller confirming that the commitment object's declared action set falls within the governing authority artifact's execution scope and does not exceed the permission boundary, or rejecting the commitment object with a commitment scope violation code; a Commitment Violation Message generated by the resource controller upon receiving a proposed action that falls outside the commitment object's declared action set or exceeds the permission boundary, the Commitment Violation Message comprising the proposed action descriptor, the specific constraint or boundary violated, the evaluation timestamp, and a resource controller cryptographic signature; and a Commitment Revocation Message revoking a specific commitment object by its commitment digest, causing the resource controller to unconditionally block all further proposed actions presented under the revoked commitment object regardless of whether those actions would otherwise fall within the declared action set. The foregoing message types are illustrative and non-limiting. In certain embodiments, the Capability Message further comprises a protocol version identifier field specifying the version or versions of the Autonomous Machine Identity and Authority Protocol (AMIAP)/Execution Authority Protocol (XAP) supported by the transmitting entity, enabling protocol participants to negotiate a mutually supported version before proceeding with subsequent handshake messages; the specific version identifier format and negotiation semantics are not limiting, provided that forward and backward compatibility semantics are preserved.

B. Semantic Field Definitions

Messages in the protocol grammar comprise one or more semantic fields including, without limitation: Authority Identifier Field uniquely identifying an authority artifact instance; Execution Scope Field specifying a machine-readable definition of permitted operations; Permission Boundary Field specifying non-exceedable execution authority limits; Constraint Field encoding runtime-evaluable conditions; Integrity Evidence Field comprising cryptographically verifiable machine integrity state data; Freshness Field comprising a nonce, timestamp, or sequence identifier; Runtime Context Representation Field representing current machine and operational state values; Digest Field comprising a cryptographic digest over a canonical representation of one or more inputs; Rationale Code Field identifying constraint evaluation outcomes; Evaluation Timing Field recording elapsed evaluation time from evaluation start to completion, enabling verification that constraint evaluation completed within an authorized maximum evaluation latency bound; and Signature Field comprising cryptographic signatures binding message contents to an issuing or enforcing entity. In certain embodiments, the protocol further employs a non-limiting error and rejection code taxonomy comprising: an Artifact Signature Failure code indicating that the cryptographic signature of an authority artifact failed verification against the configured trust anchor set; an Artifact Scope Exceedance code indicating that the requested operation falls outside the execution scope or exceeds the permission boundary; a Constraint Evaluation Failure code identifying the specific constraint that evaluated to false with the corresponding evaluation rationale; an Integrity Evidence Failure code indicating that machine integrity evidence failed validation against one or more integrity proof obligations; a Constraint Evaluation Timeout code indicating that constraint evaluation did not complete within the maximum evaluation latency bound, together with a timeout handling disposition code; a Commitment Object Signature Failure code indicating that the cryptographic signature of a commitment object failed verification; a Commitment Scope Violation code indicating that the commitment object's declared action set exceeds the governing authority artifact's execution scope or permission boundary; a Commitment Action Violation code indicating that a proposed action falls outside the commitment object's declared action set; and a Commitment Revocation code indicating that the commitment object has been revoked. Rationale codes, error codes, and rejection codes included in cryptographic proof structures are bound by the enforcement point's cryptographic signature and form part of the independently verifiable proof record. The foregoing codes are illustrative and non-limiting; implementations may employ additional codes, omit codes, or use alternative coding schemes, provided that constraint evaluation outcomes, rejection reasons, and integrity validation outcomes are recorded in a form enabling independent reproduced verification. No particular field structure is required unless explicitly recited in the claims.

Commitment Layer Semantic Fields (Non-Limiting)

In certain embodiments, the protocol grammar further supports a commitment layer operating between the authority artifact governance layer and individual execution decisions. The commitment layer employs the following additional semantic fields, which are non-limiting and may be combined with or omitted from any message type described herein: a Commitment Object Field comprising a machine-readable data structure generated by an autonomous agent or AI system prior to initiating an execution session, the Commitment Object Field including at minimum an agent identity subfield cryptographically binding the commitment object to the generating agent, a session identifier subfield providing replay protection, a declared action set subfield encoding a bounded enumeration of action types and parameter ranges the agent declares it will propose during the session, a temporal validity subfield, and a commitment binding subfield comprising an authority artifact identifier and a constraint digest computed over the constraint set of the governing authority artifact, together with a commitment object signature binding all subfields to the generating agent; a Commitment Compliance Field recording per-evaluation outcomes generated by the resource controller upon evaluating each proposed action against the commitment object's declared action set and the governing authority artifact's execution scope and permission boundary, the Commitment Compliance Field comprising for each evaluated proposed action one or more of: a commitment check outcome indicating whether the proposed action was within the declared action set; a scope check outcome indicating whether the proposed action was within the execution scope; a boundary check outcome indicating whether the proposed action was within the permission boundary; and a constraint evaluation outcome indicating whether applicable execution constraints were satisfied at the time of proposal—the Commitment Compliance Field being included in the cryptographic proof structure to enable an independent verifier to confirm, from the proof structure alone, that each proposed action was evaluated against the commitment object at the time of proposal; a Commitment Digest Field comprising a cryptographic hash of a canonical representation of the commitment object, included in the cryptographic proof structure as a tamper-evident reference enabling an independent verifier to confirm which commitment object governed the execution session; a Commitment Binding Verification Field recording a confirmation that the constraint digest in the commitment object's commitment binding subfield matches a cryptographic digest of the constraint set of the governing authority artifact, preventing submission of a commitment object whose declared constraint scope was computed from a different constraint set than the one encoded in the authority artifact; and a Commitment Provenance Field included in a derived commitment object generated by a second autonomous agent operating under the authorization of a first autonomous agent, the Commitment Provenance Field comprising the first agent's authority artifact identifier and the first agent's commitment digest, enabling an independent verifier to reconstruct a complete multi-agent commitment derivation chain from cryptographic proof structures alone. The foregoing fields are illustrative and non-limiting; implementations may employ additional fields, omit fields, or represent these fields in alternative formats, provided that the semantic content enabling commitment scope evaluation, constraint digest verification, and independent reproduced verification of action-by-action compliance is preserved.

C. Canonical Representation and Determinism

In certain embodiments, one or more protocol messages or message components are transformed into a canonical representation prior to cryptographic operations. A canonicalization function transforms a runtime context or message component into a canonical representation such that semantically equivalent inputs produce identical output regardless of field ordering, data type encoding, or serialization format-enabling independent entities reproducing the same inputs to obtain identical digest values. The specific canonicalization function employed is not limiting provided it satisfies this consistency requirement, and the canonicalization function need not be deterministic in the strict algorithmic sense provided it produces consistent and reproducible output for equivalent semantic inputs. This property enables independent verification of cryptographic proof structures by recomputing digests from reproduced inputs without access to internal enforcement point state.

D. Transport and Encoding Independence

The protocol grammar is independent of transport layer and encoding format. Messages may be conveyed over network-based transport protocols, inter-process communication channels, message queues or event streams, and embedded or device communication interfaces. Message encoding may use structured text encodings, binary encodings, or compact representations. No limitation is imposed on transport or encoding mechanisms unless explicitly recited in the claims.

E. Constraint Representation and Negotiation Semantics

In certain embodiments, constraint fields are expressed in a portable constraint language capable of being evaluated against runtime context values with consistent, reproducible outcomes. Constraint negotiation messages may propose modifications to a constraint set subject to the monotonic constraint rule. Constraint representations may include logical expressions, parameter bounds, temporal conditions, resource state predicates, and evaluation latency bounds. The specific syntax or representation is not limiting.

F. Cryptographic Proof Structure and Verification Semantics

In certain embodiments, receipt messages comprise a cryptographic proof structure—also referred to as a verifiable execution receipt, verification artifact, or execution authorization record—including: an authority artifact identifier; an execution decision indicator; a runtime context digest; one or more rationale codes; an evidence reference set; an evaluation timing field; and a cryptographic signature. The structure is configured such that an independent verifier can recompute at least one digest and validate one or more signatures to confirm that execution occurred in compliance with the authority artifact and constraint set, and that constraint evaluation completed within the authorized latency bound. The specific arrangement or encoding of components is not limiting. A data structure denominated otherwise than "receipt"—including an audit token, event record, or execution log entry—constitutes a cryptographic proof structure within the meaning of this disclosure if it enables independent reproduced verification as described herein. A cryptographic proof structure may be explicitly generated as a discrete data structure or implicitly derivable from system outputs that, taken together, collectively encode the authorization decision, the authority artifact identifier, and the runtime context binding in a form that permits independent reproduced verification, provided that the information necessary for such verification is accessible directly or indirectly to an authorized verification entity.

G. Non-Limiting Nature of Grammar

The protocol message grammar is provided to illustrate embodiments of structured communication supporting execution authority governance. The grammar does not limit the scope of the claimed invention to any specific message format, field arrangement, encoding scheme, or transport mechanism. Implementations may employ alternative message structures, combine message types, omit fields, or introduce additional fields, provided that the underlying functional semantics-conveyance of execution authority, reproducible constraint evaluation, integrity validation, execution control, latency-bounded enforcement, race condition handling, and cryptographic proof structure generation enabling reproduced verification—are preserved. The protocol may be implemented as an independent protocol layer operating alongside or above existing communication, authentication, and authorization frameworks, or embedded within existing communication, orchestration, identity, or control frameworks, without limitation, provided that the execution authority governance and cryptographic proof structure generation functions described herein are performed.

XVIII-A. Protocol State Machines and Canonical Message Structures (Non-Limiting Embodiments)

In certain embodiments, the Autonomous Machine Identity and Authority Protocol (AMIAP), also referred to as the Execution Authority Protocol (XAP), may be implemented using one or more deterministic or partially ordered processing sequences, referred to herein as state machines, and one or more structured message representations, referred to herein as canonical message structures or wire structures.

The state machines and message structures described in this section are illustrative and non-limiting. Implementations may employ alternative sequencing, parallel evaluation, distributed processing, reordered operations, or functionally equivalent processing constructs without departing from the scope of the present disclosure, provided that the underlying functional semantics—execution authority validation, runtime constraint evaluation, integrity verification, execution control, and cryptographic proof structure generation—are preserved. Processing sequences, state transitions, and message structures that achieve substantially equivalent functional outcomes—including equivalent execution authority validation, constraint evaluation with consistent and reproducible outcomes, integrity verification, execution control decision generation, and cryptographic proof structure generation—are considered within the scope of the present disclosure regardless of structural differences, ordering differences, naming conventions, or implementation topology.

A. Authorization Processing State Machine (Illustrative)

In certain embodiments, an enforcement point processes an execution request according to a processing sequence comprising one or more of the following functional states: Request Reception State—receiving an execution request associated with an authority artifact; Artifact Retrieval State—retrieving one or more authority artifacts or artifact references; Integrity Validation State—validating cryptographic signatures and canonical representations; Delegation Evaluation State—evaluating one or more delegation relationships associated with the authority artifact; Context Acquisition and Validation State—obtaining and validating runtime context values; Revocation Evaluation State—evaluating revocation or lifecycle status; Decision Generation State—producing an execution control decision; and Receipt Generation State—generating a cryptographic proof structure. The ordering of the foregoing states is not limiting. In certain embodiments, one or more states may be executed concurrently, conditionally, iteratively, or in partially overlapping execution windows. In certain embodiments, two or more of the foregoing states may be combined into a single processing operation, or any single state may be decomposed into a plurality of sub-states or processing steps, without departing from the scope of the present disclosure, provided that the functional outcome of the combined or decomposed operation is substantially equivalent to the functional outcome of the individual states as described herein.

B. Authority Artifact Validation State Machine (Illustrative)

In certain embodiments, validation of an authority artifact is performed according to a processing sequence including one or more of: receiving or retrieving the authority artifact; verifying one or more cryptographic signatures; validating canonical representation or encoding; evaluating lifecycle conditions including activation and expiration; evaluating execution scope and permission boundary; and producing an acceptance or rejection outcome. The validation process may be distributed across multiple components or combined into a single validation operation.

C. Delegation Graph Evaluation State Machine (Illustrative)

In certain embodiments, delegation relationships between authority artifacts are evaluated using a graph-based or functionally equivalent structure. Processing may include: constructing or accessing a representation of delegation relationships; identifying one or more candidate authorization paths; validating delegation relationships or edges; evaluating scope attenuation and constraint inheritance rules; and determining whether a valid authorization path exists. The graph representation may be explicit, implicit, cached, streamed, or computed on demand. Alternative representations, including tree structures, chain representations, or constraint propagation models, may be employed.

D. Execution Receipt Verification State Machine (Illustrative)

In certain embodiments, a verification entity performs independent verification of a cryptographic proof structure using a processing sequence including: receiving the cryptographic proof structure; retrieving one or more referenced authority artifacts or artifact identifiers; recomputing one or more authorization or constraint evaluation outcomes; comparing recomputed values to values recorded in the cryptographic proof structure; validating cryptographic signatures; and producing a verification result. Verification may be performed fully or partially, and may rely on reproduced inputs, cached values, or externally supplied context data.

Commitment Binding Processing State Machine (Illustrative)

In certain embodiments, a resource controller processes an autonomous agent's execution session according to a commitment binding processing sequence comprising one or more of the following functional states: Commitment Object Reception State—receiving the commitment object together with the governing authority artifact; Authority Artifact Signature Verification State—verifying the cryptographic signature of the governing authority artifact against at least one trust anchor, with unconditional denial on failure; Commitment Object Signature Verification State—verifying the cryptographic signature of the commitment object against the agent's identity, with unconditional denial on failure; Commitment Scope Validation State—determining that the commitment object's declared action set falls within the execution scope and does not exceed the permission boundary of the governing authority artifact, with unconditional rejection of any commitment object whose declared action set exceeds the permission boundary; Action Proposal Reception State—receiving a proposed action from the autonomous agent during the execution session; Commitment Evaluation State—evaluating the proposed action against the declared action set of the commitment object with consistent, reproducible, or verifiably consistent outcomes, and evaluating the proposed action against the execution scope and permission boundary of the governing authority artifact; Runtime Context Acquisition State—obtaining the runtime context at the time the action is proposed and not at a prior session establishment or credential issuance time; Constraint Evaluation State—evaluating applicable execution constraints against the runtime context; Integrity Validation State—validating machine integrity evidence against the integrity proof obligations at the time of proposal; Execution Control State—controlling execution of the proposed action by permitting, blocking, or permitting with applied execution controls; and Commitment Proof Structure Generation State—generating a cryptographic proof structure comprising an authority artifact identifier, an authorization decision indicator, a runtime context digest, a commitment digest, a commitment compliance field, and a cryptographic signature binding all foregoing fields. The ordering of the foregoing states is not limiting. In certain embodiments, one or more states may be executed concurrently, conditionally, or iteratively, provided that the functional outcome—per-action commitment compliance evaluation producing a commitment-inclusive cryptographic proof structure enabling independent reproduced verification—is preserved.

Canonical Commitment Object Structure (Non-Limiting)

In certain embodiments, a commitment object comprises one or more of the following semantic fields: an agent identity field cryptographically binding the commitment object to the generating autonomous agent through a public key, certificate reference, or hardware attestation-bound identifier; a session identifier field providing replay protection for the commitment object within a single execution session; a declared action set field encoding a bounded enumeration of action types, resource targets, and parameter ranges the autonomous agent declares it will propose during the execution session, expressed in a portable action constraint representation capable of evaluation with consistent, reproducible outcomes; a temporal validity field encoding a validity interval after which the commitment object is no longer valid for presentation to a resource controller; a commitment binding field comprising an authority artifact identifier identifying the governing authority artifact and a constraint digest computed as a cryptographic hash of a canonical representation of the constraint set of the governing authority artifact, the commitment binding field preventing the commitment object from being presented as valid under any authority artifact other than the one whose identifier and constraint digest are incorporated in the commitment binding field; and one or more commitment object signature fields binding all foregoing fields to an issuing or attesting authority. In certain embodiments, the commitment object further comprises a parameter constraint field encoding declared bounds on action parameters; a resource target set field encoding a bounded enumeration of resources the agent may act upon; a multi-agent provenance field comprising a provenance reference identifying a parent commitment object in a multi-agent commitment derivation chain; and a temporal action window field encoding permitted time intervals for proposed actions. The arrangement, encoding, ordering, and representation of commitment object fields are not limiting. References herein to a commitment object expressly include structurally equivalent commitment objects irrespective of denomination, field ordering, encoding format, serialization representation, or storage topology.

E. Canonical Authority Artifact Structure (Non-Limiting)

In certain embodiments, an authority artifact comprises one or more of the following semantic fields: an artifact identifier; an issuer identifier; a subject or machine identity; an execution scope definition; one or more delegation or constraint-related parameters; lifecycle information including activation and expiration; and one or more cryptographic signatures. The arrangement, encoding, ordering, and representation of such fields are not limiting. Fields may be combined, omitted, extended, or represented in alternative formats. The semantic fields described herein may be represented as explicit fields within a structured data format, implicit derivations computed from other fields or context, computed values generated at evaluation time, or references to externally stored data structures, provided that the information required for execution authority evaluation, constraint enforcement, and independent verification is accessible directly or indirectly by the enforcement point and any authorized verification entity at the time of evaluation or verification.

F. Verifiable Execution Receipt Structure (Non-Limiting)

In certain embodiments, a cryptographic proof structure—also referred to as a verifiable execution receipt or verification artifact—comprises one or more of: a receipt identifier; a reference to an execution request or operation; a representation or digest of evaluated authority artifacts or artifact chains; an execution authorization result; a timestamp or temporal indicator; one or more rationale or evaluation indicators; a cryptographic signature; and, in certain embodiments, additional fields including context digests, evaluation timing data, or evidence references. In certain embodiments supporting the commitment layer, the cryptographic proof structure further comprises a commitment digest field comprising a cryptographic hash of a canonical representation of the commitment object governing the execution session, enabling an independent verifier to confirm which commitment object governed the session; and a commitment compliance field as described in the commitment layer semantic fields disclosure of Section XVIII, enabling an independent verifier to confirm, from the proof structure alone and without access to resource controller internal state, that each proposed action was evaluated against the commitment object at the time of proposal and that the recorded evaluation outcomes are tamper-evident. Field arrangement and encoding are not limiting.

G. Revocation Structure (Non-Limiting)

In certain embodiments, revocation information is represented using a revocation structure comprising one or more of: a revocation identifier; a reference to an affected authority artifact; a revocation condition or reason; a temporal indicator; and a cryptographic signature. Revocation information may be distributed, cached, streamed, or embedded within other protocol messages.

H. Non-Limiting Nature of State Machines and Structures

The state machines and canonical message structures described herein are provided to illustrate representative implementations of protocol behavior. The present disclosure is not limited to any specific state sequence, state naming convention, message structure, field definition, encoding format, or processing topology. Implementations may employ alternative computational models, including event-driven systems, stream processing, parallel evaluation, speculative execution, or distributed consensus mechanisms, provided that the functional objectives of execution authority enforcement and verifiable execution are achieved.

What is claimed is:

1. A computer-implemented method of execution control in a distributed computing system, the method comprising:

receiving, by an enforcement point in a distributed computing environment, a request to execute a computational operation, the request accompanied by an authority artifact comprising a machine-readable execution scope, a machine-readable permission boundary, one or more machine-readable execution constraints each encoding a runtime condition to be evaluated against current machine state at the time the computational operation is requested, and one or more machine-readable integrity proof obligations specifying categories and freshness requirements of cryptographically verifiable machine integrity evidence;

verifying, by the enforcement point, a cryptographic signature of the authority artifact against at least one trust anchor, wherein signature verification failure causes unconditional denial of the computational operation independent of any other evaluation;

determining, by the enforcement point, that the requested computational operation falls within the execution scope and does not exceed the permission boundary, wherein boundary exceedance causes unconditional denial independent of constraint evaluation;

obtaining, by the enforcement point, a runtime context comprising current values of machine state variables corresponding to the one or more execution constraints, wherein the runtime context is obtained at the time the computational operation is requested and not at a prior session establishment, authentication, or credential issuance time;

evaluating, by the enforcement point, each of the one or more execution constraints against the runtime context with consistent, reproducible, or verifiably consistent outcomes, wherein an independent party presented with the same constraint set and runtime context obtains the same or a verifiably equivalent evaluation outcome;

validating, by the enforcement point, current machine integrity evidence against the one or more integrity proof obligations at the time the computational operation is requested;

controlling execution of the computational operation by permitting execution, denying execution, or permitting execution with one or more applied execution controls; and generating, by the enforcement point, a cryptographic proof structure comprising at least an authority artifact identifier, an authorization decision indicator, a runtime context digest, and a cryptographic signature binding the authorization decision to the authority artifact identifier and the runtime context digest.

2. The method of claim 1, wherein the enforcement point evaluates each of the one or more execution constraints within a maximum evaluation latency bound specified in the authority artifact or enforcement point configuration, wherein expiration of the maximum evaluation latency bound before completion of evaluation causes the enforcement point to execute a specified timeout handling behavior comprising at least one of: entering degraded mode with scope restriction and constraint tightening; issuing a denial decision with a timeout rationale code; or suspending execution pending recovery of a constraint evaluation subsystem, and wherein the cryptographic proof structure further comprises an evaluation timing field recording elapsed time from evaluation start to evaluation completion.

3. The method of claim 2, wherein, when two or more concurrent execution requests present overlapping resource state preconditions, the enforcement point applies a constraint evaluation serialization mechanism comprising at least one of: an optimistic concurrency control protocol in which the enforcement point computes a resource state digest and includes the resource state digest in the cryptographic proof structure for subsequent consistency verification; a pessimistic locking protocol in which the enforcement point acquires a distributed lock over contested resource state before evaluating resource state precondition constraints; or a speculative evaluation protocol in which the enforcement point evaluates constraints speculatively and includes a speculative evaluation flag in the cryptographic proof structure pending confirmation of resource state consistency.

4. The method of claim 3, wherein the enforcement point records race condition detection events, a conflict resolution policy applied, and resolution outcomes in the cryptographic proof structure with corresponding rationale codes.

5. The method of claim 1, wherein the one or more execution constraints comprise at least one of: a temporal validity interval or change window; a network zone restriction; a geographic boundary condition; a rate limit or volume limit; a maximum impact bound evaluated as a runtime check against current resource state; a resource state precondition conditioning execution on current state of a dependent resource; a parameter bound constraining allowable values of execution parameters; or an approval or co-signature condition for a designated high-risk operation class.

6. The method of claim 5, wherein the one or more execution constraints further comprise a maximum evaluation latency bound encoded in the authority artifact and validated by the enforcement point as a constraint condition.

7. The method of claim 1, wherein permitting execution with one or more applied execution controls comprises at least one of: throttling of execution rate; sandboxing within a restricted execution environment; canary execution in a monitored non-production context prior to full execution; a step-up proof condition imposing an additional proof obligation responsive to a runtime risk score exceeding a configurable threshold; parameter redaction substituting sensitive execution parameters; post-action integrity verification; rollback conditioning; or a co-signature condition for an operation classified as destructive or exceeding a configurable impact threshold.

8. The method of claim 1, further comprising transmitting or storing the cryptographic proof structure to an append-only audit log and anchoring at least one cryptographic hash-chain value derived from the cryptographic proof structure to an external integrity service, wherein anchoring enables independent detection of tampering with, deletion of, or reordering of cryptographic proof structures in the audit log.

9. The method of claim 1, further comprising forming a cryptographically linked chain by including in the cryptographic proof structure a hash of a prior cryptographic proof structure, wherein the chain enables detection of deletion or reordering of proof structures in an audit log and enables an independent verifier to confirm sequential integrity of authorization decisions.

10. The method of claim 1, further comprising: receiving a derived authority artifact that references a parent authority artifact and includes a derivation proof; and validating the derivation proof to confirm that the derived authority artifact does not expand the permission boundary of the parent authority artifact and that each constraint in the derived authority artifact is equal to or stricter than the corresponding constraint in the parent authority artifact, wherein the enforcement point unconditionally rejects any derived authority artifact failing this validation.

11. The method of claim 1, further comprising translating an external authority artifact issued by a first administrative domain into a domain-internal derived authority artifact for a second administrative domain, embedding provenance references identifying the first domain and the external authority artifact identifier, and applying additional local constraints of the second administrative domain that tighten but do not relax any constraint from the external authority artifact.

12. The method of claim 1, wherein the authority artifact is hardware-bound to a requesting machine entity, and wherein validating cryptographically verifiable machine integrity evidence comprises requiring fresh attestation evidence generated by a Trusted Platform Module or Trusted Execution Environment associated with the requesting machine entity, the fresh attestation evidence being bound to a current platform measurement state of the requesting machine entity within a freshness window specified by the one or more integrity proof obligations.

13. The method of claim 1, wherein the authority artifact is embodied as a Machine Authority Token (MAT) comprising at least a machine identity field cryptographically binding the authority artifact to a specific machine entity, an execution scope field defining permitted operations, a permission boundary field encoding one or more non-exceedable limits on execution authority, one or more integrity proof obligation fields specifying categories and freshness requirements of cryptographically verifiable machine integrity evidence, one or more execution constraint fields encoding runtime conditions to be evaluated at the time of execution, and one or more cryptographic signature fields binding the foregoing fields to an issuing authority, wherein structurally equivalent authority artifacts irrespective of denomination, field ordering, encoding format, or storage topology are within the scope of this claim.

14. The method of claim 1, further comprising: receiving a commitment object generated by an autonomous agent or AI system, the commitment object cryptographically bound to an identifier of the authority artifact and a digest of the constraint set; gating execution of each action proposed by the autonomous agent against the commitment object and the authority artifact; blocking any proposed action that falls outside commitment object scope or exceeds the permission boundary; and including a commitment digest in the cryptographic proof structure.

15. The method of claim 1, wherein the authority artifact is generated by an authority service configured to: receive an authority request from a requesting machine entity identifying a requested operation; establish a cryptographically verifiable machine identity associated with the requesting machine entity; determine whether to authorize the requested operation based on authorization conditions comprising one or more of a device posture trust score, a risk score derived from behavioral analytics, a geo-fence condition, or a network zone condition; generate the authority artifact encoding the execution scope, permission boundary, constraint set, and integrity proof obligations for the requesting machine entity; and sign the authority artifact with at least one issuer signing key stored in a hardware security module.

16. The method of claim 1, further comprising receiving a revocation notification and thereafter unconditionally denying execution requests accompanied by the revoked authority artifact, wherein revocation is triggered by at least one of: detection of an anomaly in execution behavior associated with the authority artifact; suspicion of signing key compromise; a change in applicable policy rendering the artifact non-compliant; or exceedance of a configurable runtime risk threshold.

17. The method of claim 1, wherein the enforcement point comprises at least one of: an API gateway; a service mesh sidecar proxy; a host-level security agent; a kernel-level execution interception hook; a cloud control plane interceptor; a continuous integration and deployment pipeline controller; or a device or IoT controller.

18. A non-transitory computer-readable medium storing instructions that, when executed by one or more processors of an enforcement point in a distributed computing system, cause the enforcement point to perform the method of claim 1.

19. A system for execution control in a distributed computing system, the system comprising:

one or more processors; and one or more non-transitory computer-readable media storing instructions that, when executed by the one or more processors, cause the system to implement:

one or more enforcement point components configured to receive an authority artifact encoding an execution scope, a permission boundary, a constraint set comprising one or more execution constraints, and one or more integrity proof obligations; obtain a runtime context at the time of an execution request; evaluate each constraint in the constraint set against the runtime context with consistent, reproducible, or verifiably consistent outcomes;

validate machine integrity evidence against the integrity proof obligations at the time of the execution request; and generate a cryptographic proof structure comprising a runtime context digest, a rationale code set, and a cryptographic signature binding an authorization decision to an authority artifact identifier and the runtime context digest;

and one or more verification components configured to receive the cryptographic proof structure, recompute a verification digest from reproduced runtime context inputs, compare the verification digest to the runtime context digest in the cryptographic proof structure, validate the cryptographic signature, and generate a verification output indicating whether execution was authority-compliant, wherein the cryptographic proof structure enables reproduced verification of authorization conditions independent of access to internal state of any of the enforcement point components or the verification components; and wherein: the authority artifact functions as a signed machine-executable authority token distinct from a session authentication credential and distinct from a generic audit log entry; the one or more enforcement point components validate attestation-derived machine integrity evidence at execution time rather than only at authentication time or session establishment time; the cryptographic proof structure is stored in or transmitted to a tamper-evident append-only logging structure; and the canonical constraint digest included in the cryptographic proof structure enables an independent verifier to confirm both (i) that a compiled enforcement rule set applied by the one or more enforcement point components faithfully corresponds to the portable constraint representation and (ii) that the authorization decision was produced under execution-time validation of machine integrity evidence, whereby the system provides protocol-level execution authority enforcement and independent reproduced verification that is not reducible to a combination of an authorization engine, a signed token, an attestation subsystem, a tamper-evident logging mechanism, and a policy compilation subsystem operating independently.

20. The system of claim 19, wherein the one or more verification components operate according to a verification processing sequence comprising one or more of: receiving the cryptographic proof structure; retrieving one or more referenced authority artifacts or artifact identifiers; recomputing one or more authorization or constraint evaluation outcomes; comparing recomputed values to values recorded in the cryptographic proof structure; validating cryptographic signatures; and producing a verification result.

21. The system of claim 19, wherein the one or more enforcement point components and the one or more verification components are deployed as separate infrastructure elements comprising at least two of: an API gateway performing constraint evaluation; a service mesh sidecar proxy performing scope and boundary checking; a host-level security agent performing integrity evidence validation; a receipt verification service performing independent reproduced verification via digest computation and signature validation; and an audit logging service storing cryptographic proof structures in an append-only log, wherein the cryptographic proof structure generated by the cooperating infrastructure elements enables end-to-end independent reproduced verification of the authorization decision regardless of the degree of architectural separation among the elements.

22. The system of claim 19, wherein the one or more processors are further configured to implement a constraint compiler that translates execution constraints expressed in a portable constraint representation into one or more enforcement-point-specific rule formats comprising at least one of an API gateway policy rule, a service mesh sidecar policy, a host-level agent rule, a CI/CD pipeline controller policy, or a device controller policy table, wherein the constraint compiler generates a canonical constraint digest that the enforcement point includes in the cryptographic proof structure, enabling independent verifiers to confirm that the deployed rule set faithfully implements the portable constraint representation.

23. The system of claim 19, wherein at least one of the one or more enforcement point components or the one or more verification components operates according to a processing state machine comprising one or more of: request reception, artifact retrieval, integrity validation, delegation evaluation, context acquisition and validation, revocation evaluation, decision generation, cryptographic proof structure generation, receipt verification, or verification result generation, wherein alternative sequencing, concurrent execution, iterative execution, or partial overlap of such states remains within scope provided that execution authority validation and independent reproduced verification are preserved.

24. The system of claim 19, wherein the cryptographic proof structure generated for a first execution decision includes a cryptographic hash of a prior cryptographic proof structure generated for a prior execution decision, thereby forming a cryptographically linked chain enabling an independent verifier to confirm sequential integrity, detect deletion or reordering of proof structures, and verify a prior-hash linkage between related authorization decisions.

25. The system of claim 19, wherein the one or more enforcement point components include a constraint compilation subsystem configured to translate a portable constraint representation into enforcement-point-specific rule formats for a plurality of heterogeneous enforcement point types, and wherein the cryptographic proof structure includes a canonical constraint digest identifying the canonical constraint representation applied during evaluation, enabling an independent verifier to confirm faithful implementation of the portable constraint representation across the plurality of heterogeneous enforcement point types.

* * * * *